(12) United States Patent  
Dou et al.

(10) Patent No.: US 12,395,906 B2  
(45) Date of Patent: Aug. 19, 2025

(54) CELL SELECTION METHOD AND TERMINAL DEVICE

(71) Applicant: HUAWEI TECHNOLOGIES CO., LTD., Guangdong (CN)

(72) Inventors: Fenghui Dou, Beijing (CN); Xuyang Du, Shenzhen (CN); Rui Yang, Beijing (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 17/924,770

(22) PCT Filed: Apr. 28, 2021

(86) PCT No.: PCT/CN2021/090748  
§ 371 (c)(1),  
(2) Date: Nov. 11, 2022

(87) PCT Pub. No.: WO2021/227883  
PCT Pub. Date: Nov. 18, 2021

(65) Prior Publication Data  
US 2023/0199637 A1    Jun. 22, 2023

(30) Foreign Application Priority Data

May 14, 2020    (CN) .......................... 202010405414.8  
Aug. 26, 2020   (CN) .......................... 202010873837.2

(51) Int. Cl.  
*H04W 36/00* (2009.01)  
*H04W 48/20* (2009.01)

(52) U.S. Cl.  
CPC ... *H04W 36/008375* (2023.05); *H04W 48/20* (2013.01)

(58) Field of Classification Search  
CPC ....................... H04W 36/008375; H04W 48/20  
(Continued)

(56) References Cited

U.S. PATENT DOCUMENTS 11,949,485 B2 * 4/2024 Koskela ............ H04W 74/0833  
2002/0098838 A1 * 7/2002 Ikeda .................... H04B 7/022  
455/67.11

(Continued)

FOREIGN PATENT DOCUMENTS

| CN | 102457918 A | 5/2012 |
| CN | 104010315 A | 8/2014 |
| CN | 107548117 A | 1/2018 |
| CN | 108040351 A | 5/2018 |
| CN | 109474965 A | 3/2019 |

(Continued)

OTHER PUBLICATIONS

R2-1906231(Revision of R2-1903900), Ericsson, Addition of handover indication for QoE measurements, 3GPP TSG RAN2 Meeting #106, Reno, US, May 13-17, 66 pages.

(Continued)

*Primary Examiner* — Marcos Batista  
(74) *Attorney, Agent, or Firm* — WOMBLE BOND DICKINSON (US) LLP

(57) ABSTRACT

A cell selection method and a terminal device. The method includes: A terminal device detects a plurality of cells. The terminal device obtains historical quality of experience QoE of each of N cells. The N cells are all or some of the plurality of cells, N is a positive integer, and the historical QoE is used to represent historical network use experience of the terminal device in each cell. The terminal device selects a first cell from the plurality of cells based on the historical QoE. The terminal device camps on the first cell.

20 Claims, 13 Drawing Sheets

(58) Field of Classification Search
USPC .......................................... 370/331; 455/312
See application file for complete search history.

(56) References Cited

U.S. PATENT DOCUMENTS

| | | | |
|---|---|---|---|
| 2011/0117909 A1* | 5/2011 | Cao | H04W 48/18 |
| | | | 455/423 |
| 2014/0022918 A1 | 1/2014 | Guo et al. | |
| 2019/0327702 A1 | 10/2019 | Wang | |
| 2020/0028782 A1 | 1/2020 | Li et al. | |

FOREIGN PATENT DOCUMENTS

| | | |
|---|---|---|
| WO | 2016074446 A1 | 5/2016 |
| WO | 2017147787 A1 | 9/2017 |
| WO | 2017170011 A1 | 10/2017 |

OTHER PUBLICATIONS

3GPP TS 36.304 V16.0.0 (Mar. 2020), 3rd Generation Partnership Project;Technical Specification Group Radio Access Network;Evolved Universal Terrestrial Radio Access (E-UTRA); User Equipment (UE) procedures in idle mode (Release 16), 58 pages.

S2-1901667, China Mobile, Data collection proposal for RSRP and RSRQ, SA WG2 Meeting #131, Feb. 25-Mar. 1, 2019, Santa Cruz de Tenerife, Spain, 5 pages.

3GPP TS 36.331 V16.0.0 (Mar. 2020), 3rd Generation Partnership Project;Technical Specification Group Radio Access Network;Evolved Universal Terrestrial Radio Access (E-UTRA); Radio Resource Control (RRC);Protocol specification (Release 16), 1048 pages.

\* cited by examiner

CELL SELECTION METHOD AND TERMINAL DEVICE

CROSS-REFERENCE TO RELATED APPLICATIONS

This application is a national stage of International Application No. PCT/CN2021/090748, filed on Apr. 28, 2021, which claims priority to Chinese Patent Application No. 202010873837.2, filed on Aug. 26, 2020 and Chinese Patent Application No. 202010405414.8, filed on May 14, 2020. All of the aforementioned applications are incorporated herein by reference in their entireties.

TECHNICAL FIELD

This application relates to the field of communication technologies, and in particular, to a cell selection method and a terminal device.

BACKGROUND

Terminal devices, such as mobile phones or tablet computers, become important tools for daily life, entertainment, office work, and the like of a user. For example, the terminal device has a network access function, which enables the user to browse a web page, watch an online video, and the like.

However, in some scenarios, network access experience of a terminal device is not good. For example, a user at home accesses a terminal device to a cell A. However, since a large quantity of terminal devices access the cell A during peak hours (for example, from 8:00 p.m. to 10:00 p.m.) every day, network stalling or even network access failure occurs on the terminal device, affecting user experience.

SUMMARY

An objective of this application is to provide a cell selection method and a terminal device, to improve network access experience of the terminal device.

According to a first aspect, a cell selection method is provided. The method may be applied to a terminal device, and the terminal device includes, for example, a mobile phone or a tablet computer. The method includes: A terminal device detects a plurality of cells. The terminal device obtains historical quality of experience (QoE) of each of N cells. The N cells are all or some of the plurality of cells, N is a positive integer, and the historical QoE is used to represent historical network use experience of the terminal device in each cell. The terminal device selects a first cell from the plurality of cells based on the historical QoE. The terminal device connects to the first cell.

In an embodiment of the application, the terminal device selects a cell based on historical QoE of the cell. Different from existing cell selection based on a direct measurement result (that is, a first measurement result below) of the cell, the cell selection method provided in this application can avoid accessing a cell with a poor network (for example, network stalling), to improve network access experience of the terminal device.

In an embodiment, the method further includes: when the N cells are all of the plurality of cells, the terminal device obtains a first measurement result of each of the N cells. The first measurement result includes reference signal receiving power (RSRP) and/or reference signal receiving quality (RSRQ). The terminal device suppresses or enhances the first measurement result of each cell based on the historical QoE of each of the N cells, to obtain a second measurement result. The first cell is a cell, in the N cells, whose second measurement result is the highest or whose second measurement result is greater than a threshold.

The first measurement result is a direct measurement result of a cell, and is a measurement result that is not suppressed or enhanced. The second measurement result is not a direct measurement result, but a measurement result that is suppressed or enhanced.

In an embodiment of the application, after the terminal device detects the plurality of cells, the terminal device may store historical QoE of all or some of the plurality of cells. Assuming that QoE of all cells is obtained, the terminal device suppresses or enhances the first measurement result of each cell based on the QoE of each cell, and selects a cell based on a suppressed or enhanced measurement result. Different from existing cell selection based on the first measurement result of the cell, the cell selection method provided in this application can avoid accessing a cell with a poor network (for example, network stalling), to improve network access experience of the terminal device.

In an embodiment, the method further includes: when the N cells are some of the plurality of cells, the terminal device obtains a first measurement result of each of the plurality of cells. The first measurement result includes RSRP and/or RSRQ. The terminal device suppresses or enhances the first measurement result of each cell based on the historical QoE of each of the N cells, to obtain a second measurement result. The first cell is a cell whose measurement result is the highest or whose measurement result is greater than a threshold in second measurement results of the N cells and first measurement results of remaining cells, and the remaining cells are other than the N cells in the plurality of cells.

In an embodiment of the application, after the terminal device detects the plurality of cells, the terminal device may store historical QoE of all or some of the plurality of cells. It is assumed that QoE of only some cells is stored. For example, three cells are detected: a cell A to a cell C, the cell A and the cell C have QoE, and the cell B does not have QoE. In this case, the terminal device may suppress or enhance a first measurement result of the cell A based on the QoE of the cell A, and suppress or enhance a first measurement result of the cell C based on the QoE of the cell C. That is, the terminal device obtains a second measurement result of the cell A and a second measurement result of the cell C, and further obtains a first measurement result of the cell B. In this case, based on a sorting result of the second measurement result of the cell A, the second measurement result of the cell C, and the first measurement result of the cell B, it is determined that a cell with the highest measurement result is accessed. Different from existing cell selection based on the first measurement result of the cell, the cell selection method provided in this application can avoid accessing a cell with a poor network (for example, network stalling), to improve network access experience of the terminal device.

In an embodiment, that the terminal device suppresses or enhances the first measurement result of each cell based on the historical QoE of each of the N cells, to obtain a second measurement result includes: determining an evaluation result of the historical QoE of each of the N cells, where the evaluation result is historical evaluation of network performance of a cell based on network use experience of the cell after the terminal device is connected to each of the N cells; and suppressing or enhancing the first measurement result of each cell based on the evaluation result, to obtain the second measurement result.

In an embodiment of the application, the terminal device selects a cell based on historical QoE of the cell. For example, the terminal device suppresses or enhances, based on a scoring result of historical QoE of a cell, a first measurement result of the cell to obtain a second measurement result, and selects the cell based on the second measurement result. Different from existing cell selection based on the first measurement result of the cell, the cell selection method provided in this application can avoid accessing a cell with a poor network (for example, network stalling), to improve network access experience of the terminal device.

In an embodiment, the suppressing or enhancing the first measurement result of each cell based on the evaluation result of each of the N cells, to obtain the second measurement result includes:

determining suppression strength or enhancement strength corresponding to the evaluation result; and suppressing or enhancing the first measurement result of each cell based on the suppression strength or the enhancement strength.

In an embodiment of the application, the terminal device selects a cell based on historical QoE of the cell. For example, a corresponding suppression or enhancement level is determined based on a scoring result of historical QoE of a cell, to suppress or enhance a first measurement result of the cell to obtain a second measurement result, and the cell is selected based on the second measurement result. Different from existing cell selection based on the first measurement result of the cell, the cell selection method provided in this application can avoid accessing a cell with a poor network (for example, network stalling), to improve network access experience of the terminal device.

In an embodiment, the method further includes: The terminal device determines whether there is an evaluation result of the historical QoE of the first cell, and if there is no evaluation result of the historical QoE of the first cell, evaluates network performance of the first cell to obtain an evaluation result. If the evaluation result meets a condition, the terminal device continues camping on the first cell. If the evaluation result does not meet a condition, the terminal device cancels suppression on first measurement results of the N cells. The terminal device selects a second cell based on the first measurement results of the N cells and third measurement results of the remaining cells, and hands over from the first cell to the second cell.

The foregoing example is still used. The terminal device detects the cell A, the cell B, and the cell C, and the terminal device may store historical QoE of all or some of the plurality of cells. If QoE of only some cells are stored, the terminal device may select the first cell that has no historical QoE. Therefore, in an embodiment of the application, the terminal device may further determine whether there is an evaluation result of the historical QoE of the first cell. If there is no evaluation result of the historical QoE of the first cell, the terminal device evaluates the network performance of the first cell to obtain the evaluation result. If the evaluation result meets a condition, it indicates that the network performance of the first cell is relatively good. In this case, the terminal device can continue camping on the first cell. If the evaluation result does not meet a condition, it indicates that the network performance of the first cell is relatively poor. In this case, the terminal device may cancel suppression on the first measurement results of the N cells, and reselect a cell (for example, select a cell based on the first measurement result of the cell).

In an embodiment, that the evaluation result meets a condition includes:

the evaluation result indicates that the network performance of the first cell is smooth;

the evaluation result indicates that a quantity of times that the network performance of the first cell is smooth within preset duration is greater than a preset quantity of times;

the evaluation result indicates that duration in which the network performance of the first cell is smooth is greater than preset duration;

the evaluation result indicates that the network performance of the first cell is higher than network performance of a plurality of neighboring cells; or the evaluation result indicates that the network performance of the first cell is higher than a threshold.

That is, if there is no historical QoE of the first cell, the terminal device may quickly evaluate the network performance of the first cell to obtain an evaluation result. If the evaluation result indicates that the network performance of the first cell is smooth, smoothness duration is greater than the preset duration, or the quantity of smoothness times is greater than the preset quantity of times, or the network performance of the first cell is higher than network performance of another surrounding cell, the terminal device continues camping on the first cell; otherwise, the terminal device hands over to another cell with higher network performance. Therefore, in this manner, in a cell handover process, the terminal device can access a cell with better network performance.

In an embodiment, a higher evaluation result of historical QoE indicates lower suppression strength on a cell or higher enhancement strength on a cell.

For example, the historical QoE of the cell A is higher than the historical QoE of the cell B. Therefore, suppression strength of the cell A is lower than suppression strength of the cell B. In this case, there is a relatively high probability that a suppressed measurement result of the cell A is greater than a suppressed measurement result of the cell B, and there is a high probability that the terminal device accesses the cell A. Alternatively, if enhancement strength of the cell A is higher than enhancement strength of the cell B, there is a relatively high probability that an enhanced measurement result of the cell A is greater than an enhanced measurement result of the cell B, and there is a high probability that the terminal device accesses the cell A. In this manner, the terminal device can select a cell with better QoE for access, to improve network use experience.

In an embodiment, that the terminal device obtains historical quality of experience QoE of each of N cells includes: An application processor in the terminal device obtains the historical QoE of each of the N cells. The historical QoE of each cell is historical evaluation of network performance of the cell based on network use experience of the cell after the terminal device is connected to each cell.

In an embodiment of the application, a process of determining the historical QoE of the cell may be performed by the application processor in the terminal device.

In an embodiment, that the terminal device selects a first cell from the plurality of cells based on the historical QoE includes: The application processor sends the historical QoE of each of the N cells to a modem in the terminal device, so that the modem selects the first cell from the plurality of cells based on the historical QoE.

In an embodiment of the application, a process of determining the historical QoE of the cell may be performed by the application processor in the terminal device. The application processor sends the historical QoE of the cell to the modem, and the modem selects the cell based on the historical QoE.

In an embodiment, when the N cells are all of the plurality of cells, the modem is further configured to: obtain the first measurement result of each of the N cells, where the first measurement result includes the RSRP and/or the RSRQ; and suppress or enhance the first measurement result of each cell based on the historical QoE of each of the N cells, to obtain the second measurement result. That the modem selects the first cell from the plurality of cells based on the historical QoE includes: determining, in the N cells, that the cell whose second measurement result is the highest or the cell whose second measurement result is greater than a threshold is the first cell.

In an embodiment of the application, processes of cell measurement of the terminal device, suppression or enhancement of a measurement result, and cell selection based on a suppressed or enhanced measurement result are performed by the modem.

In an embodiment, when the N cells are some of the plurality of cells, the modem is further configured to: obtain the first measurement result of each of the plurality of cells, where the first measurement result includes the RSRP and/or the RSRQ; and suppress or enhance the first measurement result of each cell based on the historical QoE of each of the N cells, to obtain the second measurement result. That the modem selects the first cell from the plurality of cells based on the historical QoE includes: determining, as the first cell, the cell whose measurement result is the highest or whose measurement result is greater than a threshold in second measurement results of the N cells and first measurement results of remaining cells. The remaining cells are other than the N cells in the plurality of cells.

In an embodiment of the application, processes of cell measurement of the terminal device, suppression or enhancement of a measurement result, and cell selection based on a suppressed or enhanced measurement result are performed by the modem.

In an embodiment, the first cell is a cell with the best historical QoE in the plurality of cells. In this manner, a measurement result of the cell does not need to be suppressed or enhanced based on the historical QoE, and the cell is directly selected based on the historical QoE, for example, the cell with the best historical QoE is selected. This is relatively simple and has relatively high efficiency.

Alternatively, the first cell is a cell with the best historical QoE in the plurality of cells in a first time period, and the first time period includes a current time point of the terminal device. Because QoE of a cell changes with time, in this manner, the terminal device may determine the cell with the best historical QoE in a current time period, and a selected cell is relatively accurate.

Alternatively, the first cell is a cell with the best historical QoE in the plurality of cells in a second time period, the second time period is a time period after a current time point of the terminal device, and a time difference between start time of the second time period and the current time point is less than a threshold. Assuming that the current time is 8:59, the terminal device may determine a cell with the best historical QoE in a time period from 9:00 to 10:00. This manner can achieve an effect of prediction in advance to some extent, and has relatively high user experience.

In an embodiment, the historical QoE includes a historical smoothness rate and/or a historical stalling rate, the cell with the best historical QoE is a cell with a highest historical smoothness rate and/or a lowest historical stalling rate, the historical smoothness rate is a historical probability that network smoothness occurs when the terminal device is connected to a cell, and the historical stalling rate is a historical probability that network stalling occurs when the terminal device is connected to a cell.

In other words, the terminal device selects a cell with a relatively high historical smoothness rate or a relatively low historical stalling rate. There is a relatively low probability that network stalling occurs on the cell with a relatively high historical smoothness rate or the cell with a relatively low historical stalling rate. This helps improve network use experience of the terminal device.

Alternatively, the historical QoE includes a historical QoE scoring result, the historical QoE scoring result is a historical score of network performance of a cell based on network use experience of the cell after the terminal device is connected to the cell, and the cell with the best historical QoE is a cell whose historical QoE scoring result is the highest or whose historical QoE scoring result is greater than a threshold.

In other words, the terminal device may score network performance of a cell that has been historically accessed, to obtain a QoE scoring result, and select a cell based on the QoE scoring result. A cell with a higher scoring result has better network use experience. Therefore, the terminal device may select a cell with a relatively high QoE scoring result, to avoid handover to a cell with a relatively poor network, so as to improve network use experience.

In an embodiment, the terminal device detects that locations of the plurality of cells are a first location. After the terminal device selects the first cell from the plurality of cells based on the historical QoE, the method further includes: controlling the terminal device to switch to a default mode. In the default mode, the terminal device selects a target cell based on a first measurement result of a cell, and the first measurement result includes RSRQ and/or RSRP. The terminal device selects a third cell in the default mode when the terminal device arrives at the first location again. The third cell is different from the first cell.

In an embodiment of the application, the terminal device may have two cell selection modes, for example, a first mode (that is, the default mode) and a second mode. The default mode is a mode in which the terminal device selects a cell based on a first measurement result in the conventional technology, and the second mode is a mode in which the terminal device selects a cell based on historical QoE of the cell provided in an embodiment of the application. At a same location, cells selected by the terminal device based on the first mode and the second mode are different, and a cell selected based on the mode provided in this application, that is, the second mode, has relatively good network experience.

In an embodiment, that the third cell is different from the first cell includes: RSRQ and/or RSRP of the first cell are/is lower than those/that of the third cell, and QoE of the first cell is higher than that of the third cell.

As described above, at a same location, cells selected by the terminal device based on the first mode (default mode) and the second mode are different. For example, at a same location, the terminal device selects the cell A based on the first mode, and selects the cell B based on the second mode. RSRQ and/or RSRP of the cell A are/is higher than those/that of the cell B, and QoE of the cell A is lower than that of the cell B. A cell selected based on the mode provided in this application, that is, the second mode, has relatively good network experience.

In an embodiment, before the terminal device obtains the historical QoE of the N cells in the plurality of cells, the method further includes: determining that signal strength of the serving cell is less than a threshold;
  detecting that a location changes and/or a displacement change amount is greater than a preset value;
  detecting that a preset scene is entered, where the plurality of cells are cells corresponding to the preset scene; or
  determining that current time reaches specific time.

In an embodiment of the application, when a trigger condition is met, the terminal device obtains historical QoE of a cell and selects the cell based on the historical QoE. For example, the trigger condition is as follows: Signal strength of a current serving cell of the terminal device is less than a threshold; or it is detected that a location changes and/or a displacement change amount is greater than a preset value; or it is detected that a preset scene is entered; or it is determined that current time reaches specific time, for example, 8:00 or 9:00. In other words, when the trigger condition is not detected, the cell selection mechanism provided in this application may not need to be executed, to reduce power consumption. When the trigger condition is detected, a cell is selected based on the cell selection mechanism provided in this application, to access a cell with relatively good network experience.

In an embodiment, the terminal device stores a correspondence among a scene, a time period, a cell, and historical QoE of the cell, and the N cells are cells that match a current time period and a current scene according to the correspondence. Before the terminal device selects the first cell from the plurality of cells based on the historical QoE, the method further includes: determining that a quantity of historical QoE statistics collection times of the N cells is greater than a preset quantity of times; or determining that a quantity of cumulative days of historical QoE statistics collection of the N cells is greater than a preset quantity of days.

In an embodiment of the application, after entering a scene (for example, a home or a company), the terminal device determines a plurality of cells that match the scene and a current time period, and may further determine whether a quantity of historical QoE statistics collection times or cumulative days of the matched cell is sufficient, to ensure accuracy of cell selection.

In an embodiment, the historical QoE score meets:

$$\sum_{i}^{N} Xi * Yi$$

Herein, i is an $i^{th}$ performance label of a cell, N is a total quantity of performance labels, Xi is an occurrence probability of the $i^{th}$ performance label, Yi is a weight corresponding to the $i^{th}$ performance label, a sum of weights corresponding to all performance labels is 1, and the performance label is a level classified by the terminal device for network performance of the cell.

In an embodiment of the application, a QoE score of a cell is determined based on a plurality of performance labels, and each performance label represents one level of network performance of the cell. If level classification is more detailed and a quantity of performance labels is larger, a finally calculated historical QoE score is more accurate, and a cell selected based on the historical QoE is more accurate.

In an embodiment, the first cell is not necessarily the same as a fourth cell, the fourth cell is a cell with strongest RSRP and/or strongest RSRQ in a plurality of neighboring cells of a fifth cell, and the fifth cell is the serving cell before the terminal device is connected to the first cell.

A cell selected based on the cell selection method provided in an embodiment of the application is not necessarily the cell with strongest RSRP and/or strongest RSRQ, but a proper cell selected based on historical QoE. In this manner, a cell with better network performance can be selected for access, to improve network use experience of the terminal device.

According to a second aspect, a terminal device is further provided, including an application processor AP and a modem.

The modem is configured to detect a plurality of cells.

The AP is configured to obtain historical quality of experience QoE of each of N cells. The N cells are all or some of the plurality of cells, N is a positive integer, and the historical QoE is used to represent historical network use experience of the terminal device in each cell.

The modem is further configured to select a first cell from the plurality of cells based on the historical QoE.

The modem is further configured to connect to the first cell.

In an embodiment, when the N cells are all of the plurality of cells, the modem is further configured to: obtain a first measurement result of each of the N cells, where the first measurement result includes reference signal receiving power RSRP and/or reference signal receiving quality RSRQ; and suppress or enhance the first measurement result of each cell based on the historical QoE of each of the N cells, to obtain a second measurement result. When being configured to select the first cell from the plurality of cells based on the historical QoE, the modem is configured to determine, in the N cells, that a cell whose second measurement result is the highest or a cell whose second measurement result is greater than a threshold is the first cell.

In an embodiment, when the N cells are some of the plurality of cells, the modem is further configured to: obtain a first measurement result of each of the plurality of cells, where the first measurement result includes RSRP and/or RSRQ; and suppress or enhance the first measurement result of each cell based on the historical QoE of each of the N cells, to obtain a second measurement result. When being configured to select the first cell from the plurality of cells based on the historical QoE, the modem is configured to determine, as the first cell, a cell whose measurement result is the highest or whose measurement result is greater than a threshold in second measurement results of the N cells and first measurement results of remaining cells. The remaining cells are other than the N cells in the plurality of cells.

In an embodiment, when being configured to obtain the historical quality of experience QoE of each of the N cells, the AP is configured to:
  determine an evaluation result of the historical QoE of each of the N cells, where the evaluation result is historical evaluation of network performance of a cell based on network use experience of the cell after the terminal device is connected to each of the N cells.

The modem is configured to suppress or enhance the first measurement result of each cell based on the evaluation result, to obtain the second measurement result.

In an embodiment, the modem is configured to:
  determine suppression strength or enhancement strength corresponding to the evaluation result; and
  suppress or enhance the first measurement result of each cell based on the suppression strength or the enhancement strength.

In an embodiment, the AP is further configured to: determine whether there is an evaluation result of the historical QoE of the first cell, and if there is no evaluation result of the historical QoE of the first cell, evaluate network performance of the first cell to obtain an evaluation result; and
  if the evaluation result meets a condition, notify the modem to continue camping on the first cell; or
  if the evaluation result does not meet a condition, notify the modem to cancel suppression on first measurement results of the N cells, so that the modem selects a second cell based on the first measurement results of the N cells and third measurement results of remaining cells, and hands over from the first cell to the second cell.

In an embodiment, that the evaluation result meets a condition includes:
  the evaluation result indicates that the network performance of the first cell is smooth;
  the evaluation result indicates that a quantity of times that the network performance of the first cell is smooth within preset duration is greater than a preset quantity of times;
  the evaluation result indicates that duration in which the network performance of the first cell is smooth is greater than preset duration;
  the evaluation result indicates that the network performance of the first cell is higher than network performance of a plurality of neighboring cells; or the evaluation result indicates that the network performance of the first cell is higher than a threshold.

According to a third aspect, a terminal device is provided, including:
  one or more processors;
  a memory; and
  one or more computer programs, where the one or more computer programs are stored in the memory, the one or more computer programs include instructions, and when the instructions are executed by an electronic device, the electronic device is enabled to perform the method according to the first aspect.

According to a fourth aspect, an electronic device is provided, including a processing unit and a communication unit.

The communication unit is configured to detect a plurality of cells.

The processing unit is configured to obtain historical quality of experience QoE of each of N cells. The N cells are all or some of the plurality of cells, N is a positive integer, and the historical QoE is used to represent historical network use experience of the terminal device in each cell.

The processing unit or the communication unit is configured to select a first cell from the plurality of cells based on the historical QoE.

The communication unit is further configured to connect to the first cell.

In an embodiment, when the N cells are all of the plurality of cells, the processing unit is further configured to obtain a first measurement result of each of the N cells. The first measurement result includes reference signal receiving power RSRP and/or reference signal receiving quality RSRQ.

The communication unit is further configured to suppress or enhance the first measurement result of each cell based on the historical QoE of each of the N cells, to obtain a second measurement result. The first cell is a cell, in the N cells, whose second measurement result is the highest or whose second measurement result is greater than a threshold.

In an embodiment, when the N cells are some of the plurality of cells, the communication unit is further configured to: obtain a first measurement result of each of the plurality of cells, where the first measurement result includes RSRP and/or RSRQ; and suppress or enhance the first measurement result of each cell based on the historical QoE of each of the N cells, to obtain a second measurement result. The first cell is a cell whose measurement result is the highest or whose measurement result is greater than a threshold in second measurement results of the N cells and first measurement results of remaining cells, and the remaining cells are other than the N cells in the plurality of cells.

In an embodiment, the communication unit is configured to: determine an evaluation result of the historical QoE of each of the N cells, where the evaluation result represents historical evaluation of network performance of a cell based on network use experience of the cell when the terminal device is connected to each of the N cells; and suppress or enhance the first measurement result of each cell based on the evaluation result, to obtain the second measurement result.

In an embodiment, the communication unit is configured to: determine suppression strength or enhancement strength corresponding to the evaluation result; and suppress or enhance the first measurement result of each cell based on the suppression strength or the enhancement strength.

In an embodiment, the processing unit is further configured to: determine whether there is an evaluation result of the historical QoE of the first cell, and if there is no evaluation result of the historical QoE of the first cell, evaluate network performance of the first cell to obtain an evaluation result.

If the evaluation result meets a condition, the communication unit continues camping on the first cell. If the evaluation result does not meet a condition, the communication unit cancels suppression on first measurement results of the N cells, selects a second cell based on the first measurement results of the N cells and third measurement results of remaining cells, and hands over from the first cell to the second cell.

In an embodiment, that the evaluation result meets a condition includes: the evaluation result indicates that the network performance of the first cell is smooth; the evaluation result indicates that a quantity of times that the network performance of the first cell is smooth within preset duration is greater than a preset quantity of times; the evaluation result indicates that duration in which the network performance of the first cell is smooth is greater than preset duration; the evaluation result indicates that the network performance of the first cell is higher than network performance of a plurality of neighboring cells; or the evaluation result indicates that the network performance of the first cell is higher than a threshold.

In an embodiment, a higher evaluation result of historical QoE indicates lower suppression strength on a cell or higher enhancement strength on a cell.

In an embodiment, the first cell is a cell with the best historical QoE in the N cells.

Alternatively, the first cell is a cell with the best historical QoE in the N cells in a first time period, and the first time period includes a current time point of the terminal device.

Alternatively, the first cell is a cell with the best historical QoE in the N cells in a second time period, the second time period is a time period after a current time point of the terminal device, and a time difference between start time of the second time period and the current time point is less than a threshold.

In an embodiment, the historical QoE includes a historical smoothness rate and/or a historical stalling rate, the cell with the best historical QoE is a cell with a highest historical smoothness rate and/or a lowest historical stalling rate, the historical smoothness rate is a historical probability that network smoothness occurs when the terminal device is connected to a cell, and the historical stalling rate is a historical probability that network stalling occurs when the terminal device is connected to a cell. Alternatively, the historical QoE includes a historical QoE evaluation result, the cell with the best historical QoE is a cell whose historical QoE evaluation result is the highest or whose historical QoE evaluation result is greater than a threshold, and the historical QoE evaluation result is historical evaluation of network performance of a cell based on network use experience of the cell after the terminal device is connected to the cell.

In an embodiment, the terminal device detects that locations of the plurality of cells are a first location.

The processing unit is further configured to control the terminal device to switch to a default mode. In the default mode, the terminal device selects a target cell based on a first measurement result of a cell, and the first measurement result includes RSRQ and/or RSRP.

The communication unit selects a third cell in the default mode when the terminal device arrives at the first location again. The third cell is different from the first cell.

In an embodiment, that the third cell is different from the first cell includes: RSRQ and/or RSRP of the first cell are/is lower than those/that of the third cell, and QoE of the first cell is higher than that of the third cell.

In an embodiment, the processing unit is further configured to: determine that signal strength of the serving cell is less than a threshold;
 detect that a location changes and/or a displacement change amount is greater than a preset value;
 detect that a preset scene is entered, where the plurality of cells are cells corresponding to the preset scene; or
 determine that current time reaches specific time.

In an embodiment, the terminal device stores a correspondence among a scene, a time period, a cell, and historical QoE of the cell, and the N cells are cells that match a current time period and a current scene according to the correspondence.

The processing unit is further configured to: determine that a quantity of historical QoE statistics collection times of the N cells is greater than a preset quantity of times; or determine that a quantity of cumulative days of historical QoE statistics collection of the N cells is greater than a preset quantity of days.

In an embodiment, the evaluation result of the historical QoE meets:

$$\sum_{i}^{N} Xi * Yi$$

Herein, i is an $i^{th}$ performance label of a cell, N is a total quantity of performance labels, Xi is an occurrence probability of the $i^{th}$ performance label, Yi is a weight corresponding to the $i^{th}$ performance label, a sum of weights corresponding to all performance labels is 1, and the performance label is a level classified by the terminal device for network performance of the cell.

According to a fifth aspect, a chip is further provided. The chip is coupled to a memory in an electronic device, and is configured to invoke a computer program stored in the memory, to perform the method according to the first aspect.

According to a sixth aspect, a computer-readable storage medium is further provided, including instructions. When the instructions are run on an electronic device, the electronic device is enabled to perform the method according to the first aspect.

According to a seventh aspect, a computer program product is further provided, including instructions. When the instructions are run on a computer, the computer is enabled to perform the method according to the first aspect.

For beneficial effects of the second aspect to the seventh aspect, refer to descriptions of beneficial effects of the first aspect. Details are not described again.

DESCRIPTION OF EMBODIMENTS

Figure 1:
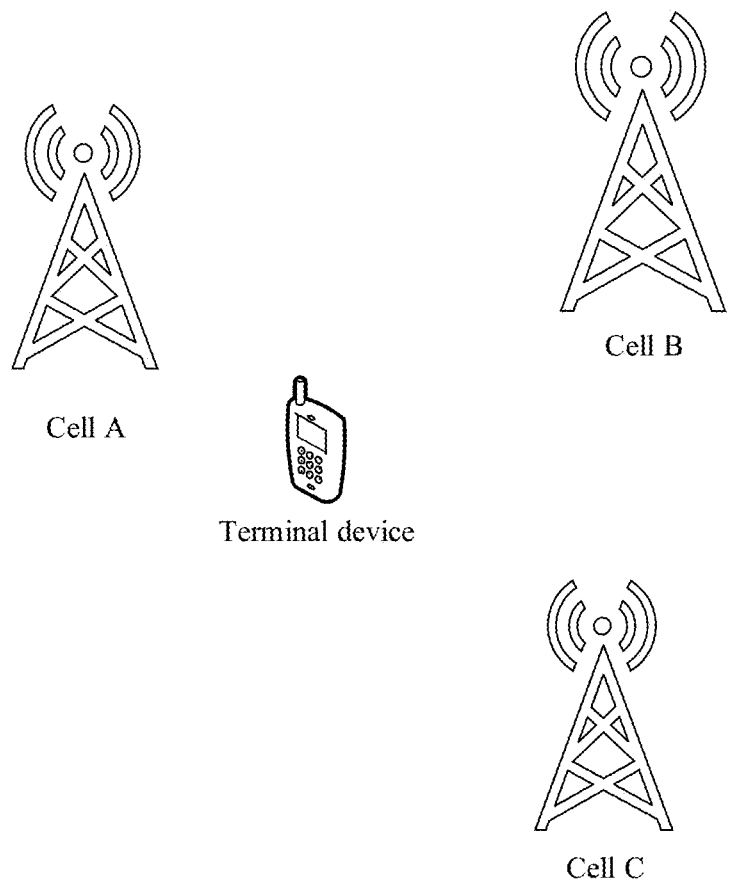
FIG. 1 is a schematic diagram of an application scenario according to an embodiment of this application.

The following first explains and describes some terms in embodiments of this application.

(1) Terminal device: The terminal device includes a device that provides a voice and/or data connectivity for a user. In an embodiment, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network over a radio access network (RAN), and exchange a voice or data with the RAN, or interact a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device may be a device such as a personal communication service (PCS) phone, a cordless phone, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

In an embodiment of the application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In embodiments of this application, the terminal device may further include a relay. Alternatively, it is understood that any device that can perform data communication with a base station may be considered as a terminal device.

In embodiments of this application, an apparatus configured to implement a function of a terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

(2) Network device: The network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet, to serve as a router between a terminal device and the remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional Node B) in an LTE system or a long term evolution-advanced (LTE-A) system, or may include a next generation NodeB (gNB) in a fifth generation (5G) NR system (also referred to as an NR system for short), or may include a centralized unit (CU) and a distributed unit (DU) in a cloud radio access network (Cloud RAN) system. This is not limited in embodiments of this application.

The network device may further include a core network device. In embodiments of this application, the core network device includes, for example, an access and mobility management function (AMF) or a user plane function (UPF) in a 5G system, or includes a mobility management entity (MME) in a 4G system.

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is a network device is used to describe the technical solutions provided in embodiments of this application.

(3) Radio resource control (RRC): In LTE, two RRC modes are supported: RRC idle mode (RRC_IDLE) and RRC connected mode (RRC_CONNECTED). In NR, an RRC inactive mode (RRC_INACTIVE) is introduced. For example, NR supports three modes: the RRC idle mode (RRC_IDLE), the RRC inactive mode (RRC_INACTIVE), and the RRC connected mode (RRC_CONNECTED). Different RRC modes can be switched.

(4) Quality of experience (QoE): Simply speaking, QoE can be understood as network access experience such as stalling and smoothness of a user when the user uses a terminal device. QoE is affected by various factors, and the factors include, for example, a geographical location of the terminal device, an access volume of a cell, and channel quality. The geographical location is used as an example. For example, when the terminal device is located in an edge area of a cell, QoE is relatively poor. The access volume of a cell is used as an example. Generally, a larger access volume indicates poorer QoE, and a smaller access volume indicates better QoE. The access volume is a total quantity of terminal devices that access the cell, and the access volume changes dynamically. Therefore, QoE of a same cell in different time periods may be different. For example, when a terminal device accesses a cell A, because an access volume is relatively small during off-peak hours, a network is smooth, and because an access volume is relatively large during peak hours, network stalling occurs. Certainly, QoE of different cells in a same time period is also different. For example, in a same time period, when a terminal device accesses a cell A, a network is smooth, and when the terminal device accesses a cell B, network stalling occurs. A reason may be as follows: In the time period, there is a relatively large access volume in the cell A and a relatively small access volume in the cell B, so network experience of the cell B is better. For example, a scenario of network stalling includes: freezing occurs in a process in which the user plays an online video (for example, a movie) by using a video playback app in the terminal device; or when the user browses a web page by using a web browsing app in the terminal device, web page content fails to be loaded or it takes long time for the loading to complete.

In some embodiments, QoE may alternatively be called service experience or network experience. The name is not limited in embodiments of this application.

(5) Mobility management mechanism of the terminal: The mobility management mechanism of the terminal is a mechanism provided to ensure that the terminal device has a continuous network service, and includes cell handover (handover) or cell reselection (reselection). The cell handover means that a terminal device in a connected (connected) mode is handed over from a current cell to another cell through neighboring cell measurement. The cell reselection is a process in which a terminal device in an idle mode or an inactive mode monitors signals of a serving cell and a neighboring cell, to select a best cell to provide a network service.

The following first briefly describes a cell reselection process and a cell handover process in an existing mechanism.

1. Cell Reselection

A process in which a terminal device performs cell reselection may include: A network device sends a neighboring cell list to the terminal device. The neighboring cell list includes information about one or more neighboring cells of a serving cell, and the information is, for example, a frequency of the neighboring cell, or a frequency and a cell identifier of the neighboring cell. Assuming that the terminal device camps on a cell A, the neighboring cell list includes information about one or more neighboring cells of the cell A, for example, a cell B and a cell C. The terminal device measures the serving cell and the neighboring cell based on the neighboring cell list to obtain reference signal receiving power (RSRP) and/or reference signal receiving quality (RSRQ) of the serving cell and the neighboring cell. Generally, the terminal device selects a cell with relatively high RSRP or a cell with relatively high RSRQ. For example, assuming that RSRQ of the cell B is greater than that of the cell A and the cell C, the terminal device selects the cell B for access. It is specified in an existing protocol that cell reselection mainly includes the following operations:

Operation 1: Measure RSRP and RSRQ of a serving cell and a neighboring cell.

Operation 2: Evaluate a high-priority cell.

A network side configures a priority relationship between different cells for a terminal device. After measuring the RSRP and the RSRQ of the serving cell and the neighboring cell, the terminal device may first evaluate energy and quality of the high-priority cell (a cell whose priority is higher than that of the serving cell). Cell reselection is performed when the following conditions are met. The conditions include: Energy of the neighboring cell is greater than an energy threshold configured by the network side or quality of the neighboring cell is higher than a quality threshold configured by the network side, and reselection evaluation time is reached.

Operation 3: Evaluate a same-priority cell.

The same-priority cell is a cell that has the same priority as the serving cell. For the same-priority cell, the terminal device performs cell reselection when detecting that the following conditions are met. The conditions include: Rn>Rs, and evaluation time is reached, where Rs is the serving cell, Rn is the neighboring cell, and Rn and Rs meet the following relationship:

$R_s = Q_{meas,s} + Q_{Hyst} - \text{Qoffset}_{temp}$ $R_n = Q_{meas,n} - \text{Qoffset} - \text{Qoffset}_{temp}$ For meanings of $Q_{meas}$, Qoffset, and $\text{Qoffset}_{temp}$, refer to Table 1.

TABLE 1

| | |
|---|---|
| $Q_{meas}$ | RSRP measurement quantity used in cell reselections (RSRP measurement quantity used in cell reselections) |
| Qoffset | For intra-frequency (intra-frequency) measurement, if $\text{Qoffset}_{s,n}$ is valid, Qoffset is equal to $\text{Qoffset}_{s,n}$, or otherwise, Qoffset is equal to 0. For inter-frequency (inter-frequency) measurement, if $\text{Qoffset}_{s,n}$ is valid, Qoffset is equal to a sum of $\text{Qoffset}_{s,n}$ and $\text{Qoffset}_{frequency}$, or otherwise, Qoffset is equal to $\text{Qoffset}_{frequency}$, and $\text{Qoffset}_{frequency}$ is Qoffset corresponding to intra-frequency |
| $\text{Qoffset}_{temp}$ | Offset temporarily applied to a cell as specified (Offset temporarily applied to a cell as specified) |

Herein, $Q_{meas,s}$ is $Q_{meas}$ of the serving cell, $Q_{meas,n}$ is $Q_{meas}$ of the neighboring cell, and $\text{Qoffset}_{s,n}$ is an energy offset between the serving cell and the neighboring cell.

Operation 4: Evaluate a low-priority cell.

The low-priority cell is a neighboring cell whose priority is lower than that of the serving cell. The terminal device performs cell reselection when detecting that the following conditions are met. The conditions include:

Energy of the serving cell is less than a threshold configured by the network side and energy of the neighboring cell is greater than the threshold configured by the network side; and reselection evaluation time is reached; or quality of the serving cell is lower than a threshold configured by a network side and quality of the neighboring cell is higher than the threshold configured by the network side, and the reselection evaluation time is reached.

2. Cell Handover

It is specified in the existing protocol that cell handover mainly includes the following operations.

Operation 1: Measure the RSRP and the RSRQ of the serving cell and the neighboring cell.

Operation 2: Report a measurement report to the network side when a condition of a measurement event configured by the network side is met, where the measurement report includes measurement results of the serving cell and the neighboring cell.

Operation 3: The network device hands over UE to a target cell based on the measurement report.

For example, the network device hands over the terminal device from the serving cell to the target cell based on the measurement report. RSRP or RSRQ of the target cell is higher than that of the serving cell. In other words, different from cell reselection, in a cell handover process, the terminal device reports the measurement report to the network device, and the network device performs the cell handover process based on the measurement report.

Therefore, in the existing mechanism, both cell reselection and cell handover are performed based on the measurement result of the terminal device. For example, a cell with relatively high RSRP or RSRQ in the measurement result is selected for access.

However, there is a case: It is assumed that the terminal device camps on the cell A, and if it is detected that RSRP or RSRQ of the neighboring cell B is higher, the terminal device is handed over from the cell A to the cell B. However, QoE of the cell B is not necessarily good. For example, a user access volume of the cell B is relatively large. As a result, after the terminal device accesses the cell B, network stalling occurs, affecting user experience.

In view of this, an embodiment of this application provides a cell selection method. In the method, a terminal device may select a cell with relatively good quality of experience QoE for access.

FIG. 1 is a schematic diagram of an application scenario according to an embodiment of this application. It is assumed that a terminal device is located within a coverage area of a cell A. The terminal device performs neighboring cell measurement, and obtains information about a cell B and a cell C through measurement. It is assumed that an RSRQ sorting result of the cell A, the cell B, and the cell C is: cell B>cell C>cell A. According to an existing mechanism, the terminal device should select the cell B for access. However, after the terminal device accesses the cell B, relatively good QoE is not necessarily obtained. Therefore, in an embodiment of the application, the terminal device may learn QoE of the cell A, the cell B, and the cell C, and select a cell with relatively good QoE for access. Assuming that the terminal device determines that QoE of the cell C is relatively good, the terminal device selects the cell C for access. Therefore, a cell selected according to the cell selection method provided in an embodiment of the application is different from a cell selected according to the existing mechanism, and the cell selected according to the cell selection method provided in an embodiment of the application can provide better QoE.

Embodiment 1

1.1-Cell QoE

The cell QoE refers to network quality experience in a process in which a terminal device exchanges data with a cell after accessing the cell. Simply speaking, the cell QoE refers to user experience of using the terminal device to access the network after the terminal device accesses the cell.

1.2-Cell QoE Evaluation

The terminal device may evaluate the cell QoE by using one or more evaluation indicators. The evaluation indicators include but are not limited to a network throughput rate, a transmission rate, a delay, a packet loss rate, a bit error rate, and the like. For example, using a transmission rate as an example, when the transmission rate is high, it is considered that QoE is good. When the transmission rate is low, the QoE is poor.

A relatively intuitive evaluation manner is to provide a plurality of performance labels (or may also be referred to as performance levels), for example, smooth, average, and stalling. The terminal device marks different performance labels for a cell based on evaluation indicators (such as a delay and a transmission rate) of the cell. In other words, a cell QoE evaluation process may be understood as a process of marking a performance label for the cell.

A plurality of evaluation indicators such as a transmission rate, a delay, a packet loss rate, and a bandwidth may be separately used, or may be used in combination. For example, a delay is separately used. When determining that the delay is less than a first threshold, the terminal device determines that the performance label of the cell is smooth. When determining that the delay is within a range between a second threshold and the first threshold, the terminal device determines that the performance label of the cell is average. When determining that the delay is greater than the second threshold, the terminal device determines that the performance label of the cell is stalling. The first threshold is lower than the second threshold.

Alternatively, the terminal device considers that smoothness occurs when determining that at least one of the following conditions is met. The conditions include but are not limited to: a delay is less than a delay threshold 1, a packet loss rate is less than a packet loss rate threshold 1, a transmission bandwidth is greater than a bandwidth threshold 1, and the like. Alternatively, the terminal device considers that stalling occurs when determining that at least one of the following conditions is met. The conditions include but are not limited to: a delay is greater than a delay threshold 2, a packet loss rate is greater than a packet loss rate threshold 2, a transmission bandwidth is less than a bandwidth threshold 2, and the like.

Certainly, in addition to the three performance labels: smooth, average, and stalling, the terminal device further sets more labels, for example, includes four performance labels: smooth, average, stalling, and severe stalling, or includes five performance labels: very smooth, smooth, average, stalling, and severe stalling. Certainly, the terminal device may alternatively set only two performance labels, for example, smooth and stalling. The following uses the three performance labels of smooth, average, and stalling as examples.

Therefore, an evaluation result obtained by evaluating QoE of a cell may be a performance label. Certainly, the evaluation result may also be a score. For details, refer to the description in Embodiment 1.3 below.

1.3-Cell QoE Learning Process

As described in 1.2 in Embodiment 1, the terminal device marks a performance label such as smooth, average, or stalling for each cell. Generally, the cell QoE is affected by an access volume, and the access volume changes dynamically. For example, in a period of time, the access volume is small, and the QoE is good. In another period of time, the access volume increases, and the QoE deteriorates. Therefore, after accessing a cell, the terminal device may evaluate QoE of the cell in real time, that is, mark a performance label in real time.

The following uses a cell A as an example to describe a process in which the terminal device learns QoE of the cell A. For example, the process of learning the QoE of the cell A includes a data statistics process and a score calculation process.

1. It is assumed that the terminal device accesses the cell A on July 1.

The data statistics process is as follows:

Two processes are included: data collection and statistics collection. The terminal device may collect data in real time (for example, every second). For example, data collected at the $1^{st}$ second after the terminal device accesses the cell A is shown in Table 2.

TABLE 2

| Cell | Collection time point | QoE | Reason |
|---|---|---|---|
| Cell A | 09:00:00 | Stalling | A transmission rate is lower than a threshold 1 |

Data collected at the $2^{nd}$ second is shown in Table 3.

TABLE 3

| Cell | Collection time point | QoE | Reason |
|---|---|---|---|
| Cell A | 09:00:01 | Smooth | The transmission rate is higher than a threshold 2 |

Data collected at the 3$^{rd}$ second is shown in Table 4.

TABLE 4

| Cell | Collection time point | QoE | Reason |
|---|---|---|---|
| Cell A | 09:00:02 | Average | The transmission rate is between the threshold 1 and the threshold 2 |

In an embodiment, to reduce power consumption, the terminal device may determine whether the screen is currently on, and if the screen is on, collect data, or otherwise, do not collect data. Alternatively/additionally, the terminal device may determine whether the terminal device is currently connected to a mobile network, and if yes, collect data, or otherwise, do not collect data. For example, if detecting that the terminal device is currently connected to a 3G or 4G mobile network, the terminal device collects data; or if detecting that the terminal device is currently connected to a wireless Wi-Fi, the terminal device does not collect data.

In other words, the terminal device may mark the performance label once at an interval (for example, every second/every several seconds/every dozens of seconds/every minute). In this way, the terminal device may obtain a large amount of data, and may collect statistics on the collected data, as shown in Table 5.

TABLE 5

Preformance marking reesult of cell A on July 1

| Cell | Cell identifier | Collection time point (s) | Performance label corresponding to QoE |||
|---|---|---|---|---|---|
| | | | Stalling | Smooth | Average |
| Cell A | Cell IDA | 09:00:00 | ✓ | | |
| | | 09:00:01 | | ✓ | |
| | | 09:00:02 | | | ✓ |
| | | 09:00:03 | | ✓ | |
| | | 09:00:04 | ✓ | | |

Refer to Table 5. The terminal device determines the performance label every second starting from the moment 09:00:00. 09:00:00 may be a moment at which the terminal device accesses the cell A, or a preset moment after the terminal device accesses the cell A. For example, the preset moment is a moment at which the terminal device uses a network for the first time after accessing the cell A, or fixed time after the moment at which the terminal device accesses the cell A. This is not limited in an embodiment of the application.

The performance label is determined every second. In this way, the terminal device obtains performance labels corresponding to the cell A at a large quantity of time points, and may collect statistics on a cumulative quantity of times of corresponding performance labels in a time period (or a time slice) in which the large quantity of time points are located. For example, refer to Table 6.

TABLE 6

Cumulative statistics result on July 1

| Cell | Cell identifier | Time period (or time slice) | Collection time point | Cumulative days | Cumulative stalling times | Cumulative smoothness times | Cumulative average times | Date | Score |
|---|---|---|---|---|---|---|---|---|---|
| Cell A | Cell IDA | 09:00:00 to 09:00:04 | 09:00:00 09:00:01 09:00:02 09:00:03 09:00:04 | 1 | 2 | 2 | 1 | July 1 | X1 |

The time period in Table 6 may be a time period including all collection time points. For example, the time period is a time period between the earliest collection time point and the latest collection time point. For example, in Table 5, collection is performed for five times, and therefore the time period is 5 s. When the quantity of collection times is large, the time period can be long. For example, if the collection is performed from 09:00:00 to 10:00:00, the time period is one hour, that is, from 09:00:00 to 10:00:00. Certainly, the time period may also be preset. For example, a day is 24 hours, and is divided into 24 time periods by default, and each time period is one hour. For example, 09:00:00 to 10:00:00 is a time period by default. If there are a plurality of collection time points and all the collection time points are between 09:00:00 and 10:00:00, data is considered as data collected from 09:00:00 to 10:00:00. Certainly, for brevity, Table 6 may not include the collection time point.

Still refer to Table 6. Assuming that the terminal device does not collect statistics on the performance label of the cell A before July 1, a quantity of the cumulative days is 1, a quantity of the cumulative stalling times is 2 (refer to Table 5) in five collections (using five collections in Table 5 as an example), a quantity of the cumulative smoothness times is 2 in five collections, and a quantity of the cumulative average times is 1 in five collections.

The score calculation process is as follows.

After collecting statistics, the terminal device may calculate a score of the cell A. A manner of calculating a scoring result may include:

(1). The terminal device sets a stalling weight, an average weight, and a smoothness weight. The smoothness weight is the highest, the average weight is lower than the smoothness weight, and the stalling weight is lower than the average weight. For example, if the maximum weight is 100, the smoothness weight is 100, the average weight is 70, and the stalling weight is 40. Alternatively, the smoothness weight, the average weight, and the stalling weight may be an interval range or any value in an interval range. For example, an interval range of the smoothness weight is (80, 100], an interval range of the average weight is (60, 80], and an interval range of the stalling weight is (40, 60]. When the smoothness weight, the average weight, and the stalling weight are interval ranges, the calculated scoring result is a value range. When the smoothness weight, the average weight, and the stalling weight are values, the calculated scoring result is a value.

The stalling weight, the average weight, and the smoothness weight may be preset fixed values or fixed interval ranges. Alternatively, the stalling weight, the average weight, and the smoothness weight may be adjusted. For example, the user may manually adjust the stalling weight, the average weight, and the smoothness weight. The terminal device may provide a weight adjustment interface, and display a current stalling weight, average weight, and smoothness weight on the interface. The user may adjust the stalling weight, the average weight, or the smoothness weight on the interface.

Certainly, if the terminal device sets four performance labels, for example, smooth, average, stalling, and severe stalling, corresponding weights may be set as follows: a smoothness weight is 100, an average weight is 80, a stalling weight is 60, and a severe stalling weight is 40; or an interval range of the smoothness weight is (80, 100], an interval range of the average weight is (60, 80], an interval range of the stalling weight is (40, 60], and an interval range of the severe stalling weight is (20, 40]. It should be noted that, regardless of a quantity of performance labels, principles of calculating scoring results of the performance labels are the same. In this specification, three performance labels: smooth, average, and stalling are used as examples to describe a scoring result calculation process.

(2) The terminal device determines a stalling rate, an average rate, and a smoothness rate of the cell A. The stalling rate is a probability that network stalling occurs after the terminal device connects to the cell A. For example, stalling rate=cumulative stalling times/total quantity of times, and total quantity of times=cumulative stalling times+cumulative smoothness times+cumulative average times. Using Table 6 as an example, the stalling rate=2/5. The average rate is a probability that an average network occurs after the terminal device connects to the cell A. For example, average rate=cumulative average times/total quantity of times, and total quantity of times=cumulative stalling times+cumulative smoothness times+cumulative average times. Using Table 6 as an example, the average rate=1/5. The smoothness rate is a probability that network smoothness occurs after the terminal device connects to the cell A. For example, smoothness rate=cumulative smoothness times/total quantity of times, and total quantity of times=cumulative stalling times+cumulative smoothness times+cumulative average times. Using Table 6 as an example, the smoothness rate=2/5.

(3) The terminal device determines the score of the cell A based on the stalling weight, the average weight, the smoothness weight, the stalling rate, the average rate, and the smoothness rate. For example, the score of the cell A meets: X1=smoothness weight×smoothness rate+stalling weight×stalling rate+average weight×average rate. X1 indicates the score. For example, X=70, 80, or 90.

The foregoing uses an example in which the performance labels are stalling, average, and smooth. Actually, more or fewer performance labels may be included. In summary, the scoring result of the cell meets:

$$\sum_{i}^{N} Xi * Yi$$

Herein, i is an $i^{th}$ performance label of the cell, N is a total quantity of performance labels, and if there are three performance labels, N=3. Xi is an occurrence probability of the $i^{th}$ performance label, Yi is a weight corresponding to the $i^{th}$ performance label, a sum of weights corresponding to all performance labels is 1, and the performance label is a level classified by the terminal device for network performance of the cell.

Operation (1) to operation (3) are the scoring result in the time period from 09:00:00 to 09:00:04 after the terminal device accesses the cell A on July 1.

It should be noted that the scoring result X1 is a current evaluation result of the terminal device on the cell A on July 1. To improve accuracy of the evaluation result of the cell A, the terminal device may continue to learn the cell A. For example, when accessing the cell A next time, the terminal device may continue to learn the evaluation result of the cell A.

2. It is assumed that the terminal device accesses the cell A again on July 2.

There is a case in which time at which the terminal device accesses the cell A again on July 2 may be different from time at which the terminal device accesses the cell A on July 1. For example, the terminal device accesses the cell A on the morning of July 1, but accesses the cell A on the night of July 2. In this case, collection time points of the terminal device on July 2 does not overlap collection time points on July 1. In this case, the terminal device may use a similar method to collect statistics on a cumulative quantity of times at a plurality of collection time points on the night of July 2, and calculate a scoring result. A principle of the method is the same as a principle of the scoring result in Table 6, except that a time period at night does not overlap a time period in Table 6.

The following describes a process in which the terminal device continues to learn the cell A by using an example in which the terminal device accesses the cell A on the morning of July 2 (that is, time at which the terminal device accesses the cell A on July 1 overlaps time at which the terminal device accesses the cell A on July 2).

The data statistics process is as follows.

On July 2, after accessing the cell A, the terminal device marks the performance label at an interval (for example, every second). For example, refer to Table 7.

TABLE 7

| | | | Performance marking result on July 2 | | |
| | | | Performance label corresponding to QoE | | |
| Cell | Cell identifier | Collection time point (s) | Stalling | Smooth | Average |
|---|---|---|---|---|---|
| Cell A | Cell IDA | 09:00:00 | ✓ | | |
| | | 09:00:01 | | ✓ | |
| | | 09:00:02 | | | ✓ |
| | | 09:00:03 | | ✓ | |
| | | 09:00:04 | ✓ | | |

The terminal device may obtain performance labels corresponding to the cell A at a large quantity of time points on July 2, and may collect statistics on a cumulative quantity of times of corresponding performance labels in a time period (or a time slice) in which the large quantity of time points are located. For example, refer to the following Table 8.

TABLE 8

Cumulative statistics result on July 2

| Cell | Cell identifier | Time period | Collection time point | Cumulative stalling times | Cumulative smoothness times | Cumulative average times | Date | Score |
|---|---|---|---|---|---|---|---|---|
| Cell A | Cell IDA | 09:00:00 to 09:00:04 | 09:00:00 09:00:01 09:00:02 09:00:03 09:00:04 | 2 | 2 | 1 | July 2 | X2 |

Table 8 may not include the collection time point. A calculation manner of X2 is similar to the foregoing calculation manner of X1. Details are not described herein again. It should be noted that X2 is a current evaluation result of the terminal device on the cell A in the time period from 09:00:00 to 09:00:04 on July 2.

To improve accuracy of a learning result of the cell A, the terminal device may iterate the current evaluation result on July 1 and the current evaluation result on July 2, to obtain a final evaluation result. For example, the terminal device may update Table 6 based on Table 8 to obtain Table 9. Table 9 may also be understood as a data superposition result of Table 8 and Table 6.

TABLE 9

Cumulative statistics result on July 1 and July 2

| Cell | Cell identifier | Time period | Collection time point | Cumulative days | Cumulative stalling times | Cumulative smoothness times | Cumulative average times | Last date | Score |
|---|---|---|---|---|---|---|---|---|---|
| Cell A | Cell IDA | 09:00:00 to 09:00:04 | 09:00:00 09:00:01 09:00:02 09:00:03 09:00:04 | 2 | 4 | 4 | 2 | July 2 | X3 |

Table 9 may not include the collection time point. The cumulative days in Table 9 are cumulative days in which the terminal device learns the cell A in the time period from 09:00:00 to 09:00:04. A quantity of the cumulative stalling times includes a sum of a quantity of the cumulative stalling times in the time period from 09:00:00 to 09:00:04 on July 1 and a quantity of the cumulative stalling times in the time period from 09:00:00 to 09:00:04 on July 2. A quantity of the cumulative smoothness times includes a sum of a quantity of the cumulative smoothness times in the time period from 09:00:00 to 09:00:04 on July 1 and a quantity of the cumulative smoothness times in the time period from 09:00:00 to 09:00:04 on July 2. A quantity of the cumulative average times includes a sum of a quantity of the cumulative average times in the time period from 09:00:00 to 09:00:04 on July 1 and a quantity of the cumulative average times in the time period from 09:00:00 to 09:00:04 on July 2.

The score calculation process is as follows.

The score X3 is an evaluation result of the terminal device on the cell A based on statistics data of July 1 and July 2. X3 may be determined in a plurality of manners, for example, at least one of Manner 1 to Manner 3.

Manner 1: X3 is an average value of X1 and X2.

Manner 2: X3 is a weighted average value of X1 and X2, for example, $X3=k1 \times X1+k2 \times X2$, where k1 and k2 are weight factors, $k1+k2=1$, and k1 and k2 may be set to preset fixed values or may be dynamically adjusted. It may be understood that, if calculation of evaluation X3 occurs on July 2, X1 is a historical evaluation result, and X2 is a current evaluation result. Therefore, the terminal device weights the current evaluation result and the historical evaluation result to obtain the final evaluation result.

Manner 3 is similar to the calculation manner of X1. For example, X3 meets the following condition: X3=smoothness weight×historical smoothness rate+stalling weight×historical stalling rate+average weight×historical average rate. The historical stalling rate refers to a historical probability that network stalling occurs after the terminal device is connected to the cell A. The "historical" herein is two days: July 1 and July 2. For example, historical stalling rate=cumulative historical stalling times/total quantity of historical times, and total quantity of historical times=cumulative historical stalling times+cumulative historical smoothness times+cumulative historical average times. Using Table 9 as an example, the historical stalling rate=4/10. The historical average rate is a historical probability that an average network occurs after the terminal device connects to the cell A. For example, historical average rate=cumulative historical average times/total quantity of historical times, and total quantity of historical times=cumulative historical stalling times+cumulative historical smoothness times+cumulative historical average times. Using Table 9 as an example, the historical average rate=2/10. The historical smoothness rate is a historical probability that a smoothness network occurs after the terminal device connects to the cell A. For example, historical smoothness rate=cumulative historical smoothness times/total quantity of historical times, and total quantity of historical times=cumulative historical stalling times+cumulative historical smoothness times+cumulative historical average times. Using Table 9 as an example, the historical smoothness rate=4/10.

3. Assuming that the terminal device collects statistics on data in the time period from 09:00:00 to 09:00:04 again on July 3, the score of the cell A may be calculated in any one of Manner 1 to Manner 3. Assuming that Manner 1 is used, and a current evaluation result on July 3 is X4, the final evaluation result is an average value of X1, X2, and X4. Assuming that Manner 2 is used, the final evaluation result is a weighted average value of X1, X2, and X4. Alternatively, a final score may be calculated in the following manners:
1. Calculate the historical smoothness rate as follows: historical smoothness rate=cumulative historical smoothness times/total quantity of historical times. Similarly, historical average rate=cumulative historical average times/total quantity of historical times; and historical stalling rate=cumulative historical stalling times/total quantity of historical times. The cumulative historical smoothness times include cumulative smoothness times on July 1 and July 2. The cumulative historical average times include cumulative average times on July 1 and July 2, and the cumulative historical stalling times include cumulative stalling times on July 1 and July 2.
2. Calculate a historical score P as follows: historical score P=smoothness weight×historical smoothness rate+average weight×historical average rate+stalling weight×historical stalling rate.
3. Calculate a current smoothness rate, a current average rate, and a current stalling rate as follows: current smoothness rate=cumulative current smoothness times/total quantity of current times; current average rate=cumulative current average times/total quantity of current times; and current stalling rate=cumulative current stalling times/total quantity of current times.
4. Calculate a current score Q as follows: current score Q=smoothness weight×current smoothness rate+average weight×current average rate+stalling weight×current stalling rate.
5. Calculate the final score as follows: final score=k1× historical score+k2×current score, where k1 and k2 are weight factors, and k1+k2=1.

Therefore, through the foregoing learning process, the terminal device may learn the scoring result of the cell A, and the scoring result may be used to represent QoE of the cell A in the time period (from 09:00:00 to 09:00:04) to some extent.

It should be noted that data statistics collection may occur in real time after the terminal device is connected to the cell A, and score calculation may be performed in real time. For example, score calculation is performed immediately each time data statistics collection is performed. Alternatively, score calculation may occur at fixed time every day. For example, after collecting statistics on data of July 1, the terminal device calculates the scoring result of the cell A at fixed time (for example, 24:00) on July 1. For another example, after collecting statistics on data of July 2, the terminal device determines the final evaluation result of the cell A at fixed time (for example, 24:00) on July 2 based on the current evaluation result and the historical evaluation result. Alternatively, the terminal device performs score calculation in idle time. The idle time is, for example, screen-off time of the terminal device. Alternatively, the terminal device performs score calculation when determining that screen-off duration is greater than preset duration. Alternatively, the terminal device performs score calculation when determining that a quantity of running applications is less than a preset quantity. This is not limited in an embodiment of the application.

In some embodiments, to facilitate recording of a historical statistics result and a current statistics result, Table 9 may also be in a form of Table 10.

TABLE 10

Cumulative statistics result on July 1 and July 2

| Cell | Cell identifier | Time period | Collection time point | Cumulative days | Cumulative stalling times | Cumulative smoothness times | Cumulative average times | Last cumulative stalling times | Last cumulative smoothness times | Last cumulative average times | Last date | Score |
|---|---|---|---|---|---|---|---|---|---|---|---|---|
| Cell A | Cell IDA | | 09:00:00<br>09:00:01<br>09:00:02<br>09:00:03<br>09:00:04 | 2 | 4 | 4 | 2 | 2 | 2 | 1 | July 2 | X3 |

Table 10 may not include the collection time point. A quantity of the cumulative stalling times is a sum of a quantity of the cumulative stalling times on July 1 and a quantity of the cumulative stalling times on July 2. A quantity of the cumulative smoothness times and a quantity of the cumulative average times are obtained in the same way. The cumulative stalling times, the cumulative smoothness times, and the cumulative average times can be used to calculate a historical scoring result. The last cumulative stalling times refer to the cumulative stalling times on July 2. The last cumulative smoothness times refer to the cumulative smoothness times on July 2. The last cumulative average times refer to the cumulative average times on July 2. The last cumulative stalling times, the last cumulative smoothness times, and the last cumulative average times can be used to calculate a current scoring result. The last date refers to July 2. It should be understood that, if the terminal device collects statistics on data in the time period from 09:00:00 to 09:00:04 again on July 3, the terminal device only needs to update Table 10.

To improve a calculation rate, some aged data may be deleted. The aged data may be understood as data before preset time, for example, data one week ago or data one month ago. For example, if a quantity of the cumulative days in Table 6 reaches the preset quantity of days (for example, 7 days, 15 days, or 30 days), data before the preset quantity of days may be deleted, that is, the data before the preset quantity of days is not used to calculate the scoring result.

1.4-QoE Learning Processes of Cells in Different Scenes

In an embodiment of the application, the terminal device may learn QoE of each accessed cell, or may learn QoE of only a cell in a fixed scene. The fixed scene includes a home, a company, an on-duty route, an off-duty route, and the like. In an embodiment, a manner of determining, by the terminal device, whether a fixed scene is entered includes but is not limited to the following manners:

1. A GPS is used to determine that a fixed scene is entered. For example, if the terminal device detects that historical GPS locations in a time period are basically a location 1, the location 1 is used as a fixed scene. For example, if historical GPS locations in a time period from 9:00 a.m. to 18:00 p.m. are basically a location 1, the location 1 is marked as "company". In this case, when detecting that a current GPS location is the location 1, the terminal device determines that a current scene is "company". For another example, if historical GPS locations in a time period from 7:00 p.m. to 8:00 a.m. are basically a location 2, the location 2 is marked as "home". In this case, when detecting that a current GPS location is the location 2, the terminal device determines that a current scene is "home".

2. A fence is used to detect that a fixed scene is entered. The fence may include Wi-Fi information. For example, if the terminal device detects that historical surrounding Wi-Fi information in a time period is basically (Wi-Fi 1, Wi-Fi 2, and Wi-Fi 3), (Wi-Fi 1, Wi-Fi 2, and Wi-Fi 3) is used as a fence corresponding to the fixed scene. For example, if historical surrounding Wi-Fi information in the time period from 9:00 a.m. to 18:00 p.m. is basically (Wi-Fi 1, Wi-Fi 2, and Wi-Fi 3), (Wi-Fi 1, Wi-Fi 2, and Wi-Fi 3) is marked as a fence corresponding to "company". When detecting that surrounding Wi-Fi information is consistent with or slightly different from (Wi-Fi 1, Wi-Fi 2, and Wi-Fi 3), the terminal device determines that the current scene is "company". For another example, if historical surrounding Wi-Fi information in the time period from 7:00 p.m. to 8:00 a.m. is (Wi-Fi 4, Wi-Fi 5, and Wi-Fi 6), (Wi-Fi 4, Wi-Fi 5, and Wi-Fi 6) is used as a fence corresponding to "home". When detecting that surrounding Wi-Fi information is consistent with or slightly different from (Wi-Fi 4, Wi-Fi 5, and Wi-Fi 6), the terminal device determines that the current scene is "home". Certainly, the fence may alternatively be in another form. For example, the fence may alternatively include cell information of a mobile network. For example, if all serving cells historically detected by the terminal device in a time period are the cell A, or all serving cells are the cell A and all neighboring cells are (a cell 1, a cell 2, and a cell 3), the cell A and the neighboring cells (the cell 1, the cell 2, and the cell 3) are used as fences corresponding to fixed scenes.

If the terminal device learns only QoE of a cell in the fixed scene, a feasible manner is as follows: For example, the terminal device detects that the current scene is "home", and learns QoE of a plurality of cells in the current scene. The plurality of cells in the current scene refer to cells that can be detected in the current scene and can normally camp on. For example, at home, the terminal device can detect that there are a plurality of surrounding cells, and the terminal device may actively connect to each cell to learn QoE of each cell. Alternatively, the terminal device may learn QoE of a cell after accessing the cell, and learn QoE of another cell after being handed over to the another cell.

For example, refer to Table 11A. Table 11A shows an example of collecting data of each cell after the terminal device is connected to each cell in different scenes. In the following table, Scene indicates a scene, Time indicates a collection time point, SIM SerCGI indicates a cell global identity (CGI) of a serving cell of a subscriber identity module (SIM) card in a mobile phone, and a CGI of a cell may be an identity of the cell, referred to as CID for short. SIM SerRSRP indicates RSRP of the serving cell of the SIM card in the mobile phone. SIM SerRSRP indicates RSRP of the serving cell of the SIM card in the mobile phone.

TABLE 11A

Cell data collection in different scenes

| Scene | Time | SIM SerCGI | SIM SerRSRP | SIM SerRSRQ | QoE | Reason |
|---|---|---|---|---|---|---|
| Home | T1 | CID 1 | −64 | −94 | Smooth | |
| | T2 | CID 1 | −50 | −80 | Average | |
| Company | T3 | CID 2 | −60 | −90 | Smooth | |
| | T4 | CID 2 | −55 | −85 | Average | |

Using Table 11A as an example, the terminal device may collect statistics on a cumulative statistics result of a performance label of a cell corresponding to the scene "home" and a corresponding QoE learning result, that is, a score, or may collect statistics on a cumulative statistics result of a performance label of a cell corresponding to the scene "company" and a corresponding QoE learning result. For details, refer to descriptions of 1.3 in Embodiment 1. Details are not described herein again. For example, refer to Table 11B. Table 11B shows cumulative statistics results and QoE learning results of cells (for example, a cell A and a cell B) corresponding to the scene "home".

TABLE 11B

| Scene | Cell identifier | Time period | Cumulative days | Cumulative stalling times | Cumulative smoothness times | Cumulative average times | Last cumulative stalling times | Last cumulative smoothness times | Last cumulative average times | Last date | Score |
|---|---|---|---|---|---|---|---|---|---|---|---|
| Home | Cell A | 09:00 to 10:00 | 2 | 4 | 4 | 2 | 2 | 2 | 1 | July 2 | X3 |
|  | Cell B | 09:00 to 10:00 | 1 | 2 | 2 | 1 | 2 | 2 | 1 | July 3 | X5 |

Because a relatively large amount of data is collected, to implement data simplicity and simplify the table, information in the foregoing table may be mapped to a simple index. For example, using Table 11A as an example, RSRP and RSRQ may be converted into indexes according to a correspondence. For example, RSRP −60 dBm to −80 dBm are converted into an index "1", indicating "excellent", or "high", and RSRP −80 dBm to −100 dBm are converted into an index "0", indicating "poor", or "low". For another example, RSRQ values −60 dBm to −80 dBm are converted into an index "1", indicating "excellent", or "high", and RSRQ values −80 dBm to −100 dBm are converted into an index "0", indicating "poor", or "low". For another example, the time period may also be converted into a time index. For example, 8:00-9:00 is converted into a time index "8", and 18:00-19:00 is converted into a time index "18". Therefore, the table corresponding to Table 11A may be replaced with Table 11C.

TABLE 11C

| Scene | Time Index | SerCGI | RSRP Index | RSRQ Index | QoE | Reason |
|---|---|---|---|---|---|---|
| Home | 8 | CID 1 | Excellent | High | Smooth |  |
| Company | 18 | CID 2 | Good | Low | Average |  |

1.5-Store a Cell Learning Result

Manner 1: Establish and store a correspondence between a cell and a scoring result.

In an embodiment, in the foregoing learning process, a time period may not need to be recorded. For example, if the terminal device is connected to the cell A in a time period, and learns that a scoring result of the cell A is X, X is used as a final scoring result of the cell, instead of a scoring result of the cell A in the time period. For another example, regardless of a time period in which the terminal device is connected to the cell A, the terminal device may learn a scoring result of the cell A, and then obtain a final score by combining scoring results of the cell A in all time periods. In this case, the terminal device obtains a scoring result of each cell, and division into different time periods is not performed on the scoring result. For example, refer to Table 12. Table 12 shows an example of a scoring result of each cell.

TABLE 12

| Cell identifier | Scoring result |
|---|---|
| Cell A | 90 points to 100 points |
| Cell B | 80 points to 90 points |
| Cell C | 70 points to 80 points |

The scoring result of each cell may be a value, or may be an interval range (refer to the foregoing description). This is not limited in an embodiment of the application.

For ease of use, the terminal device may store a correspondence between a cell and a scoring result, as shown in Table 12. When selecting a target cell, the terminal device may select the target cell based on the correspondence, for example, directly select a cell whose scoring result is the highest, or suppress or enhance a cell measurement result based on a scoring result, and select a cell based on a suppressed or enhanced measurement result (details are described in Manner A to Manner C in Embodiment 2). Certainly, the correspondence may be updated. For example, a score of a cell stored in the correspondence is actually a historical score. After accessing the cell A again on a current day, the terminal device obtains a current score of the cell A, and obtains a final score of the cell A by combining the historical score in the correspondence and the current score.

Manner 2: Establish and store a correspondence among a cell, a time period, and a scoring result.

To improve accuracy of cell selection, the terminal device may record scoring results of each cell in different time periods. In this case, for a same cell, different time periods correspond to different scoring results. For example, refer to Table 13. Table 13 shows an example of a scoring result of each cell.

TABLE 13

| Cell identifier | Time period | Scoring result |
|---|---|---|
| Cell A | 8:00 to 9:00 | 90 points to 100 points |
| Cell B | 8:00 to 9:00 | 80 points to 90 points |
| Cell C | 8:00 to 9:00 | 70 points to 80 points |
| Cell A | 9:00 to 10:00 | 60 points to 70 points |
| Cell B | 10:00 to 11:00 | Below 60 points |

In the example shown in Table 13, scoring results of the cell A or the cell B in two time periods are different. In this way, the terminal device may select a more proper target cell based on different time periods.

For ease of use, the terminal device may store a correspondence among a cell, a time period, and a scoring result, as shown in Table 13. When selecting a target cell, the terminal device may select the target cell based on the correspondence. For example, if a current time point is 8:30, a scoring result corresponding to a time period (8:00 to 9:00) including the current time point is selected, and a cell is selected based on the scoring result. For another example, if a current time point is 7:59, a scoring result corresponding to a future time period such as 8:00 to 9:00 is selected, and a cell is selected based on the scoring result. The cell is selected based on an evaluation result. For example, a cell whose scoring result is the highest is directly selected, or a cell measurement result is suppressed or enhanced based on the scoring result, and a cell is selected based on the suppressed or enhanced measurement result (details are described in Manner A to Manner C in Embodiment 2).

Certainly, the correspondence may also be updated. Details are not described herein again.

Manner 3: Establish and store a correspondence among a scene, a cell, a time period, and a scoring result.

If the terminal device learns a cell of a fixed scene, the terminal device may store a correspondence between a scene, a time period, a cell, and a scoring result. For example, refer to Table 14.

TABLE 14

| Scene | Cell identifier | Time period | Scoring result |
|---|---|---|---|
| Home | Cell A | 8:00 to 9:00 | 90 points to 100 points |
| | Cell B | 8:00 to 9:00 | 80 points to 90 points |
| | Cell A | 9:00 to 10:00 | 70 points to 80 points |
| Company | Cell D | 9:00 to 10:00 | 60 points to 70 points |
| | Cell E | 10:00 to 11:00 | Below 60 points |

For ease of marking, the foregoing tables may be further simplified. For example, time period information such as 8:00 to 9:00 is converted into a time index "8", and the time period 9:00 to 10:00 is converted into a time index "9".

In an embodiment, during QoE evaluation, invalid data may be filtered out. The invalid data may include no QoE data. For example, stalling occurs on the terminal device, and the stalling is caused by a relatively large quantity of running applications and a system crash instead of a network stalling. In this case, the stalling cannot be counted into the cumulative stalling times. Alternatively, the invalid data may include stalling caused by a server fault, for example, data with uplink but no downlink. For example, the terminal device interacts with a third-party server by using a communication application, but stalling occurs on the terminal device due to a fault or maintenance of the third-party server. In this case, the stalling cannot be counted into the cumulative stalling times.

Figure 2:
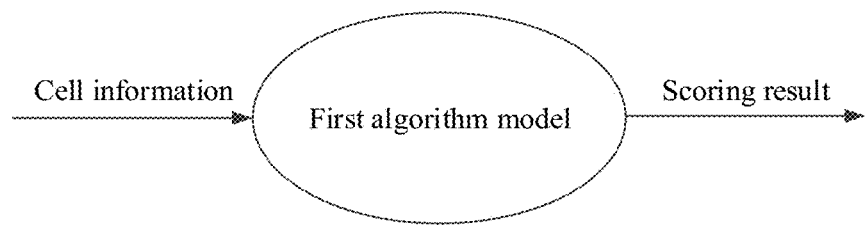
FIG. 2 is a schematic diagram of a first algorithm model according to an embodiment of this application.

In some embodiments, the cell QoE learning process may be implemented by using a first algorithm model. FIG. 2 is a schematic diagram of the first algorithm model. For example, input parameters of the first algorithm model may be data other than the score in Table 6, and an output parameter is the scoring result X1. For another example, input parameters of the first algorithm model may be data other than the scoring result in Table 8, and an output parameter is the score X2. Alternatively, input parameters of the first algorithm model may be data other than the score X3 in Table 9, and an output parameter is X3. The first algorithm model may be a decision tree, logistic regression (LR), a naive Bayes (NB) classification algorithm, a random forest (RF) algorithm, a support vector machines (SVM) algorithm, a histogram of oriented gradients (HOG), a neural network, a deep neural network, a convolutional neural network, or the like. The first algorithm model may be a model that is established in advance before delivery and stored in the terminal device; or an initial model is stored before delivery, and the first algorithm model is a model obtained after the initial model is trained. A training process may be understood as inputting an input parameter to the initial model, and performing an operation to obtain an output result (a scoring result). If the output result is inconsistent with a real result, the initial model is adjusted, so that an output result obtained by the adjusted model is close to the real result as much as possible, and a model obtained after a model parameter is adjusted is the first algorithm model.

Embodiment 2

This embodiment describes a process in which a terminal device selects a target cell based on historical QoE of the cell.

Figure 3:
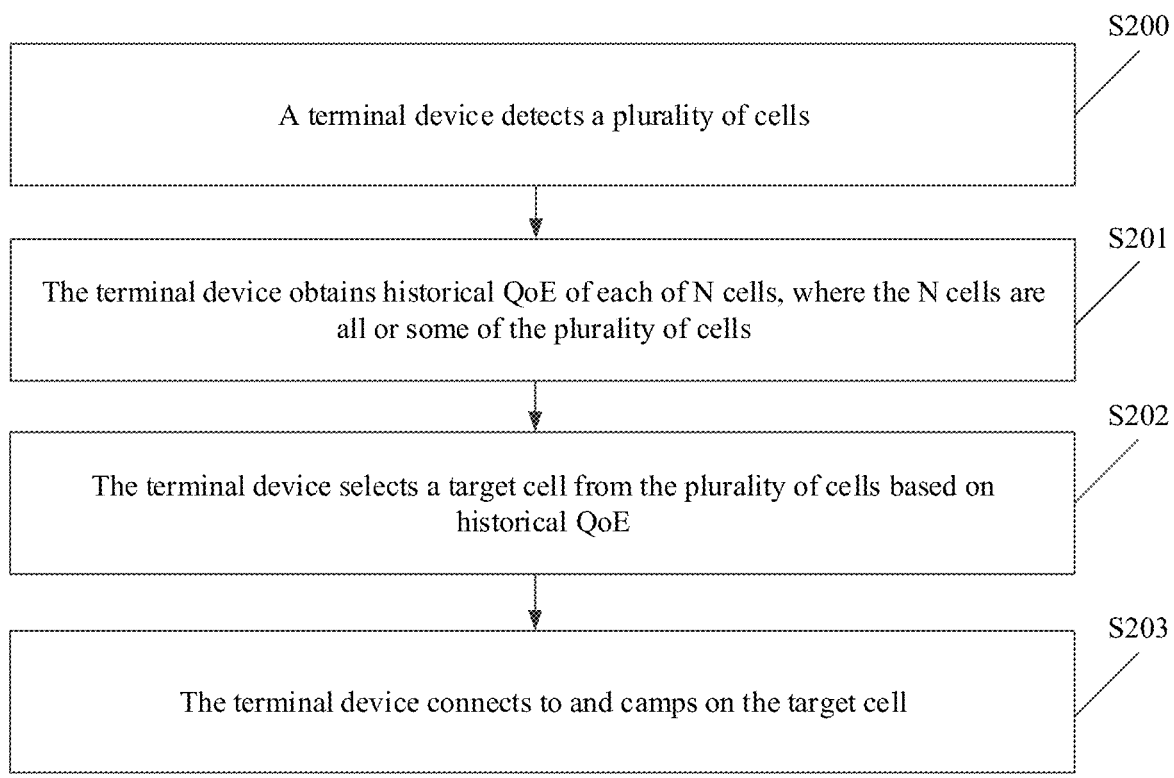
FIG. 3 is a schematic flowchart of a cell selection method according to an embodiment of this application.

FIG. 3 is a schematic flowchart of a cell selection method according to an embodiment of the application. A procedure of the method includes the following operations.

S200: A terminal device detects a plurality of cells.

The "detected cells" may be understood as a plurality of cells that meet a selection condition and that are determined through cell measurement. For example, if the terminal device is in a connected mode, a plurality of cells that meet a cell handover condition (for example, RSRP or RSRQ is higher than that of a serving cell) may be determined. If the terminal device is in an idle mode, a plurality of cells that meet a cell reselection condition (for example, Operation 2 to Operation 4 in the foregoing cell reselection process) may be determined. The plurality of cells may include a current serving cell, a neighboring cell, and the like of the terminal device. The "detecting a cell" process may be performed in real time.

S201: The terminal device obtains historical QoE of each of N cells, where the N cells are all or some of the plurality of cells.

The terminal device obtains historical QoE of a cell on a trigger occasion. The trigger occasion includes, for example, at least one of the following:

1. Each time a cell is detected, historical QoE of the cell is obtained. If a plurality of cells are detected, historical QoE of all or some of the plurality of cells is obtained.
2. It is considered that different cells are detected when a location of the terminal device changes. Therefore, when a location of the terminal device changes or a change amount is greater than a preset value, a cell is detected, and then historical QoE of the cell is obtained.
3. It is assumed that the terminal device is currently connected to a cell A. When the terminal device detects that signal strength of the cell A is lower than a threshold, it indicates that the terminal device is about to move out of the serving cell, for example, move to an edge area of the serving cell. In this case, the terminal device may detect a cell, then obtain historical QoE of the cell, and select the cell based on the historical QoE.
4. When detecting that a fixed scene is entered, the terminal device detects a cell, and then obtains historical QoE of the cell. For example, if the terminal device detects that a fixed scene "home" is entered, the terminal device selects, based on Table 11C or Table 14, a target cell from a plurality of cells corresponding to "home". For a manner in which the terminal device detects that a fixed scene is entered, refer to 1.4 in Embodiment 1.
5. The terminal device detects a cell at a fixed time point, and then obtains historical QoE of the cell. The fixed time point is, for example, an hour moment, and the hour moment is, for example, 8 o'clock, 9 o'clock, or 10 o'clock. Alternatively, the fixed time point may be a preset moment before an hour moment, for example, 8:59, 9:59, or 10:59. In this case, historical QoE of a cell in a future time period can be selected. For example, historical QoE of a cell in a time period from 9:00 to 10:00 is selected at 8:59. Alternatively, the fixed time point may be obtained at a start moment of a time period (or a time slice). For example, if the time period is 09:00 to 10:00, the fixed time point is 09:00 or 09:01.

Historical QoE includes an evaluation result of the historical QoE. The evaluation result may be a scoring result. For a process of the scoring result, refer to the description in Embodiment 1. Alternatively, the evaluation result may be a performance label, for example, smooth or stalling. The following uses scoring as an example. As shown in 1.5 in Embodiment 1, the terminal device may store a correspondence between a cell and a scoring result, as shown in Table 12, or may store a correspondence among a cell, a time period, and a scoring result, as shown in Table 13 or Table 14. If the correspondence that does not include a time period and that is shown in Table 12 is stored, the obtaining, by the terminal device, historical QoE of a cell may be obtaining a cell identifier of the cell, and determining, from the correspondence based on the cell identifier, historical QoE corresponding to the cell identifier. If the correspondence that includes a time period and that is shown in Table 13 or Table 14 is stored, the obtaining, by the terminal device, historical QoE of a cell may include: obtaining historical QoE of the cell at a current time point. For example, if the current time point is 8:30, the terminal device obtains historical QoE of the cell in a time period including 8:30. Table 13 is used as an example. It is assumed that the N cells include a cell A and a cell B, and a time period including a current time, that is, 8:30, is 8:00 to 9:00. In this case, an evaluation result of historical QoE of the cell A is 90 points to 100 points, and an evaluation result of historical QoE of the cell B is 80 points to 90 points. Alternatively, the obtaining, by the terminal device, historical QoE of a cell may further include: obtaining historical QoE of the cell in a future time period. The future time period is a preset time period after a current time point, for example, time relatively close to the current time point. For example, assuming that the current time point is 8:59, the future time period may be a time period from 9:00 to 10:00.

For example, assuming that a current day is July 5, the terminal device obtains a historical scoring result of the cell before July 5. Further assuming that a current time point is 8:30 on July 5, the terminal device obtains a historical scoring result of the cell in a time period (for example, 8:00 to 9:00) including 8:30. Alternatively, the obtaining, by the terminal device, a historical QoE scoring result of the cell may be: obtaining a historical scoring result of the cell and a current scoring result of the cell, and then obtaining a final scoring result of the cell based on the historical scoring result and the current scoring result of the cell. For a process of obtaining the final scoring result of the cell based on the historical scoring result and the current scoring result of the cell, refer to the foregoing description. Assuming that the current time point is 8:30 on July 5, the terminal device obtains the historical scoring result of the cell in the time period (for example, 8:00 to 9:00) including 8:30 and a current scoring result of the terminal device in a time period 8:00 to 8:30 on July 5, and obtains the final scoring result based on the current scoring result and the historical scoring result. In this manner, the terminal device considers the current scoring result, which is relatively accurate.

S202: The terminal device selects the target cell from the plurality of cells based on historical QoE.

It may be understood that, after the terminal device detects the plurality of cells, the terminal device may store historical QoE of all or some of the plurality of cells. Therefore, the following describes two cases.

Case 1: The N cells are all of the plurality of cells.

Assuming that historical QoE of all cells is obtained, the terminal device suppresses or enhances a direct measurement result (a first measurement result) of each cell based on the historical QoE of each cell, and selects a cell based on a suppressed or enhanced measurement result. For example, Manner 1 or Manner 2 may be used.

Manner 1: The terminal device suppresses the first measurement result of the cell based on a suppression policy, and selects the cell based on a suppressed measurement result. For example, the obtaining, by the terminal device, first measurement results of the N cells may be performed in S200, or may be performed after S200. A process in which the terminal device obtains the first measurement result of the cell may be understood as cell measurement. For example, a physical layer performs cell measurement, and then reports a measurement result to a higher layer such as an RRC layer. For a measurement process, refer to the foregoing description. Details are not described herein again. The terminal device suppresses the first measurement result of each cell based on the historical QoE of each of the N cells to obtain a second measurement result, and selects, as the target cell, a cell whose measurement result is the highest or a cell whose measurement result is greater than a threshold in the second measurement result. For example, it is assumed that the terminal device detects that first measurement results of the cell A, the cell B, and a cell C are shown in Table 15.

TABLE 15

| First measurement result | |
|---|---|
| Cell | RSRQ |
| Cell A | P1 |
| Cell A | P2 |
| Cell B | P3 |

The terminal device stores a correspondence between a scoring result and a suppression level. A higher score indicates weaker suppression. For example, refer to Table 16.

TABLE 16

| Correspondence between a suppression level and a scoring result | |
|---|---|
| Scoring result | Suppression level |
| (90 points, 100 points] | −0 dbm |
| (80 points, 90 points] | −0 dbm to −3 dbm |
| (70 points, 80 points] | −3 dbm to −10 dbm |
| (60 points, 70 points] | −10 dbm to −20 dbm |
| Below 60 points | Above −20 dbm |

A higher score indicates weaker suppression. For example, a measurement result of a cell is P=−60. If a scoring result of the cell is 90, and a corresponding suppression level is −0 dBm, a suppressed measurement result of the cell is equal to a sum of P and the suppression level, that is, P−0=−60. If a scoring result of the cell is 80, and a corresponding suppression level is −3 dbm, a suppressed measurement result of the cell is equal to a sum of P and the suppression level, that is, P−3=−63. Because −60 is greater than −63, a higher score indicates weaker suppression and a higher suppressed measurement result. If the terminal device selects the cell based on the suppressed measurement result, a higher suppressed measurement result indicates a higher probability of being selected.

For example, it is assumed that the terminal device determines corresponding suppression levels after obtaining respective scoring results of the cell A, the cell B, and the cell C. For example, a scoring result of the cell A is X1=100, and a corresponding suppression level interval is −0 dbm to −3 dbm. The terminal device may select any suppression value from the interval −0 dbm to −3 dbm to suppress a measurement result P1 of the cell A. The suppression is equal to the measurement result P1 plus the selected suppression value. For example, if the suppression value is −3 dbm and P1 is −80 dbm, a suppressed measurement result is P1−3=−83 dbm. Suppression processes for the cell B and the cell C are similar. Details are not described again. For example, suppressed measurement results of the cell A, the cell B, and the cell C are second measurement results. Refer to Table 17.

TABLE 17

Second measurement result

| Cell | RSRQ |
| --- | --- |
| Cell A | P1 − 3 dbm |
| Cell B | P2 − 5 dbm |
| Cell C | P3 − 15 dbm |

The terminal device determines, in the second measurement results, a cell with highest RSRQ for access. For example, if P2−5 dbm is greater than P1−3 dbm and P3−15 dbm, the cell B is selected.

In some other embodiments, the correspondence between a suppression level and a scoring result in Table 16 may also be replaced with a correspondence between a stalling rate and a suppression level in Table 18. A higher stalling rate indicates more suppression. In this case, the terminal device may suppress a first measurement result of a cell based on a stalling rate of the cell.

TABLE 18

Correspondence between a stalling rate and a suppression level

| Stalling rate | Suppression level |
| --- | --- |
| 0% to 10% | −0 dbm |
| 10% to 20% | −0 dbm to −3 dbm |
| 20% to 50% | −3 dbm to −10 dbm |
| 50% to 80% | −10 dbm to −20 dbm |
| 80% to 100% | Above −20 dbm |

Certainly, the correspondence between a suppression level and a scoring result in Table 16 may also be replaced with a correspondence between a smoothness rate and a suppression level. It should be understood that a higher smoothness rate indicates weaker suppression. For calculation manners of the stalling rate and the smoothness rate, refer to 1.3 in Embodiment 1.

Manner 2: Different from the suppression policy in Manner 1, Manner 2 is an enhancement policy. For example, the terminal device enhances the measurement result of each cell based on the scoring result of the historical QoE of each of the N cells to obtain the second measurement result, and selects, as the target cell, a cell whose measurement result is the highest or greater than a threshold in the second measurement result.

The terminal device may store a correspondence between a scoring result and an enhancement level. For example, Table 19 shows enhancement levels corresponding to different scoring results.

TABLE 19

Correspondence between an enhancement level and a scoring result

| Scoring result | Enhancement level |
| --- | --- |
| (90 points, 100 points] | Above 20 dbm |
| (80 points, 90 points] | 10 dbm to 20 dbm |
| (70 points, 80 points] | 3 dbm to 10 dbm |
| (60 points, 70 points] | 0 dbm to 3 dbm |
| Below 60 points | 0 |

A higher score indicates greater enhancement. For example, a measurement result of a cell is P=−60. If a scoring result of the cell is 90, and a corresponding enhancement level is 20 dBm, an enhanced measurement result of the cell is equal to a sum of P and the enhancement level, that is, P+20=−40. If a scoring result of the cell is 80, and a corresponding enhancement level is 10 dbm, an enhanced measurement result of the cell is equal to a sum of P and the enhancement level, that is, P+10=−50. Because −40 is greater than −50, a higher score indicates greater enhancement and a higher enhanced measurement result. If the terminal device selects the cell based on the enhanced measurement result, a higher enhanced measurement result indicates a higher probability of being selected.

For example, the terminal device determines corresponding enhancement levels after obtaining respective scoring results of the cell A, the cell B, and the cell C. For example, a scoring result of the cell A is X1=90, and a corresponding enhancement level interval is 10 dbm to 20 dbm. The terminal device may select any enhancement value from the interval 10 dbm to 20 dbm to enhance a measurement result P1 of the cell A. The enhancement refers to adding the selected enhancement value to the measurement result P1. For example, if the enhancement value is 10 dbm and P1 is −80 dbm, an enhanced measurement result is −70 dbm. Enhancement processes for the cell B and the cell C are similar. Details are not described again.

Similarly, the correspondence between an enhancement level and a scoring result in Table 19 may also be replaced with a correspondence between a stalling rate and an enhancement level, or certainly may be replaced with a correspondence between a smoothness rate and an enhancement level, or the like.

Case 2: The N cells are some of the plurality of cells.

For example, three cells are detected in total: the cell A to a cell C. The terminal device stores historical QoE of the cell A and the cell C, but does not store historical QoE of the cell B.

In this case, the terminal device may detect a first measurement result of the cell A, a first measurement result of the cell B, and a first measurement result of the cell C. Because the cell A and the cell C have historical QoE, the terminal device may suppress or enhance the first measurement result of the cell A based on the historical QoE of the cell A to obtain a second measurement result of the cell A, and suppress or enhance the first measurement result of the cell C based on the historical QoE of the cell C to obtain a second measurement result of the cell C. The terminal device determines, based on a sorting result of the second measurement result of the cell A, the second measurement result of the cell C, and the first measurement result of the cell B, a cell whose measurement result is the highest or higher than a threshold as the target cell.

Manner 1 and Manner 2 may be used in combination. For example, when a scoring result of a cell is greater than a threshold, the enhancement policy is used; or when a scoring result of a cell is less than a threshold, the suppression policy is used.

It may be understood that, in addition to Manner 1 and Manner 2, another manner may be further included. For example:

The terminal device selects a cell whose historical QoE score is greater than a threshold. Assuming that a quantity of cells whose scores are greater than the threshold is 1, the cell is selected as the target cell. Assuming that a quantity of cells whose scores are greater than the threshold is greater than 1, a cell with a highest score is selected as the target cell, or a cell with highest signal strength is selected as the target cell. In this manner, when selecting the target cell, the terminal device considers only a scoring result of the cell, and does not need to suppress or enhance the measurement result. This is relatively simple.

Alternatively, the terminal device may select a cell whose smoothness rate is the highest or whose smoothness rate is greater than a threshold, and/or a cell whose stalling rate is the lowest or whose stalling rate is less than a threshold. For a manner of calculating the smoothness rate and the stalling rate, refer to 1.3 in Embodiment 1. Certainly, if a plurality of cells are selected based on the smoothness rate or the stalling rate, a cell with strongest RSRP and/or RSRQ in the plurality of cells may be selected.

S203: The terminal device camps on the target cell.

It should be noted that, that the terminal device camps on the target cell may include a plurality of cases. For example, if an original serving cell of the terminal device is the target cell, no action is performed. For another example, if the terminal device is originally not in the target cell and is in an idle mode, the terminal device needs to initiate cell reselection to camp on the target cell. For a cell reselection process, refer to the foregoing description. For another example, if the terminal device is originally not in the target cell and is in a connected mode, the terminal device performs a cell handover to hand over to the target cell. For a cell handover process, refer to the foregoing description.

Embodiment 3

In case 2 in Embodiment 2, a terminal device may select a cell with QoE, for example, a cell A or a cell C, or may select a cell without QoE, for example, a cell B. Because there is no historical QoE of the cell B in the terminal device, that is, the terminal device does not know the QoE of the cell B, a quick learning policy may be started. The quick learning policy may be understood as that the cell QoE learning process in Embodiment 1 is immediately executed. Performance or a score of the cell B can be learned through the quick learning policy. Whether to continue camping on the cell B or reselect a cell is determined based on a learning result of the cell B. The quick learning policy includes Manner 1 or Manner 2:

Manner 1: After camping on the cell B, the terminal device determines a performance label of the cell B. For a manner of determining a performance label by the terminal device, refer to 1.2 in Embodiment 1. If the performance label of the cell B meets the following preset conditions, the cell B continues to be camped on. The preset conditions include:

the performance label of the cell B is smooth;

a quantity of times that the performance label of the cell B is smooth within preset duration is greater than a preset quantity of times;

duration in which network performance of the cell B is smooth is longer than preset duration; or the terminal device detects a plurality of cells, and compares performance labels of the plurality of cells, where the performance label of the cell B is smooth, and performance labels of other cells are all "average" or "stalling", or a quantity of times that the performance label of the cell B is smooth within preset duration is the higher than that of the other cells.

The foregoing preset conditions may be separately used, or may be used in combination. For example, if the performance label of the cell B is smooth, performance labels of the other cells may not be considered, and the cell B continues to be camped on. If the performance label of the cell B is "average" or "stalling", a cell whose performance label is smooth may be selected from the other cells.

Assuming that the performance label of the cell B does not meet the preset condition, the terminal device is handed over from the cell B to another cell. The another cell may be the original cell A, or another neighboring cell (a neighboring cell other than the cell A) of the cell B. For example, in the plurality of cells detected by the terminal device, the another cell is a cell with strongest QoE, for example, a highest score, in the plurality of cells, or a cell selected based on a suppressed (or enhanced) measurement result obtained by suppressing (or enhancing) the plurality of detected cells based on a suppression policy (or enhanced measurement). For details, refer to Manner 1 or Manner 2 in Embodiment 2.

It should be noted that the terminal device may be handed over from the cell B to another cell in a plurality of cases. For example, if the terminal device is in a connected mode after selecting the cell B and camping on the cell B, the terminal device performs a cell handover procedure to hand over to another cell. For the cell handover procedure, refer to the foregoing description. For another example, if the terminal device is in an idle mode after selecting the cell B and camping on the cell B, the terminal device performs a cell reselection procedure to reselect another cell. For the cell reselection procedure, refer to the foregoing description.

Manner 1 is relatively simple. Statistics on cumulative smoothness times, cumulative stalling times, a scoring result, and the like do not need to be collected, which saves time. For example, after the terminal device is handed over to the cell B, data (such as a delay and a transmission rate) is collected only once, a performance label of the cell B is determined by using the data, and whether to continue staying in the cell B is determined based on the performance label. Therefore, performance of the cell B can be quickly determined in Manner 1.

Manner 2: After camping on the cell B, the terminal device collects statistics on a cumulative quantity of times of the performance label of the cell B. For example, the terminal device immediately collects statistics on a cumulative result of the performance label of the cell B starting from a moment at which the terminal device is handed over to the cell B. For example, similar to Table 6, the terminal device may obtain a scoring result of the cell B. Assuming that the terminal device determines that the scoring result of the cell B is greater than a threshold and/or greater than a scoring result of the original cell A, the terminal device continues camping on the cell B. Otherwise, the terminal device is handed over to another cell. Alternatively, if it is determined that a stalling rate of the cell B is lower than a threshold and/or lower than a stalling rate of the original cell A, the terminal device continues camping on the cell B. Otherwise, the terminal device is handed over to another cell. Alternatively, if it is determined that a smoothness rate of the cell B is greater than a threshold and/or greater than a smoothness rate of the original cell A, the terminal device continues camping on the cell B. Otherwise, the terminal device is handed over to another cell. A manner of selecting another cell may be Manner 1 or Manner 2 in Embodiment 2.

In Manner 2, after camping on the cell B, the terminal device collects statistics on a cumulative quantity of times of the performance label of the cell B, and a more accurate evaluation result of the cell B may be obtained based on the cumulative quantity of times of the performance label. For example, after camping on the cell B, the terminal device collects a plurality of groups of data (a delay, a transmission rate, and the like), and each group of data may be used to determine a performance label, so as to collect statistics on the cumulative quantity of times of the performance label, to obtain a relatively accurate evaluation result. It should be understood that, in Manner 2, it takes time to collect statistics on the cumulative quantity of times of the performance label of the cell B. Therefore, duration may be controlled within a range, for example, 2 s, 3 s, 5 s, 7 s, or 10 s. It is assumed that data (a delay, a transmission rate, and the like) is collected every second. If duration is 5 s, five groups of data may be used for statistics.

Embodiment 4

A terminal device may set two cell selection mechanisms: a first selection mechanism and a second selection mechanism. The first selection mechanism is, for example, the existing mechanism described above. This selection mechanism may be understood as a signal strength priority mechanism. For example, a target cell is selected based on a directly detected measurement result. For example, signal strength (for example, RSRQ) of a cell A and a cell B is detect, and a cell with stronger signal strength is selected for camping on. The second selection mechanism is a selection mechanism provided in an embodiment of the application. This selection mechanism may be understood as a user experience priority mechanism. For example, a target cell is selected based on a QoE scoring result (for example, Manner A or Manner B in Embodiment 2).

For example, a network search main control module is disposed in the terminal device, and the network search main control module may specify the first selection mechanism or the second selection mechanism. If the first selection mechanism is specified, a cell is selected based on the first selection mechanism. If the second selection mechanism is specified, a cell is selected based on the second selection mechanism. The network search main control module may determine, according to a policy, whether to specify the first selection mechanism or the second selection mechanism.

For example, the second selection mechanism is used by default, and when the user specifies the first selection mechanism, the first selection mechanism is used. For example, a manner of specifying by a user is as follows: a cell selection mechanism switching button is displayed on an interface of the terminal device, and the user controls switching between the first selection mechanism and the second selection mechanism by controlling the switching button.

Alternatively, the terminal device accesses a cell, but detects that all neighboring cells of the cell have no learning result. In this case, the terminal device may use the first selection mechanism. If all neighboring cells of the cell have no learning result, the terminal device does not know QoE of the neighboring cell. To learn the QoE of the neighboring cell, the terminal device may select a cell based on the first selection mechanism. After the QoE of the neighboring cell is learned, the terminal device may select a cell based on the QoE to avoid handover to a cell with relatively poor QoE.

Alternatively, the terminal device accesses a cell, but detects that all scoring results of neighboring cells of the cell are lower than a threshold. In this case, the terminal device may use the first selection mechanism. In a case in which QoE of all neighboring cells is relatively poor, it indicates that network experience of all the neighboring cells is poor. In this case, a cell with highest RSRP and/or RSRQ may be selected for access based on the first selection mechanism, because a cell with relatively high RSRP and/or RSRQ can bear a large access volume.

Cells selected by the terminal device by using the first selection mechanism and the second selection mechanism are different. For example, it is assumed that the terminal device is currently connected to the cell A, the terminal device moves to a location W in a time period, and detects that neighboring cells include the cell B and a cell C. Based on the first selection mechanism, the terminal device selects the cell B because RSRQ of the cell B is greater than that of the cell A and the cell C. It is assumed that after the terminal device is connected to the cell B, QoE is first QoE. At the same location W, in the same time period, the terminal device selects the cell C when using the second selection mechanism. Although RSRQ of the cell C may be lower than that of the cell B, QoE of the cell C is better than that of the cell B. For example, it is assumed that after the terminal device is connected to the cell C, QoE is second QoE. The second QoE is better than the first QoE. For example, it is assumed that the first QoE includes, for example, after the terminal device is connected to the cell B, a transmission rate is a first rate, a transmission delay is a first delay, a bit error rate is a first bit error rate, and the like. For details about the transmission rate, the delay, the bit error rate, and the like, refer to descriptions in 1.2 in Embodiment 1. For example, the second QoE includes: after the terminal device is connected to the cell C, a transmission rate is a second rate, a transmission delay is a second delay, a bit error rate is a second bit error rate, and the like. For details about the transmission rate, the delay, the bit error rate, and the like, refer to descriptions in 1.2 in Embodiment 1. That the second QoE is better than the first QoE includes: the second rate is greater than the first rate, and/or the second delay is less than the first delay, and/or the second bit error rate is less than the first bit error rate, and the like.

From a perspective of use by the user, after the terminal device selects, based on the first selection mechanism, to connect to the cell B in a same time period at a same location, network stalling occurs, for example, frame freezing occurs in a process of playing an online video, or web page content cannot be loaded for long time in a process of browsing a web page. However, after the terminal device selects, based on the second selection mechanism, to connect to the cell C in a same time period at a same location, a network is smooth, for example, no frame freezing occurs in a process of playing an online video, and web page content can be quickly loaded during web page browsing.

Embodiment 5

Figure 4A:
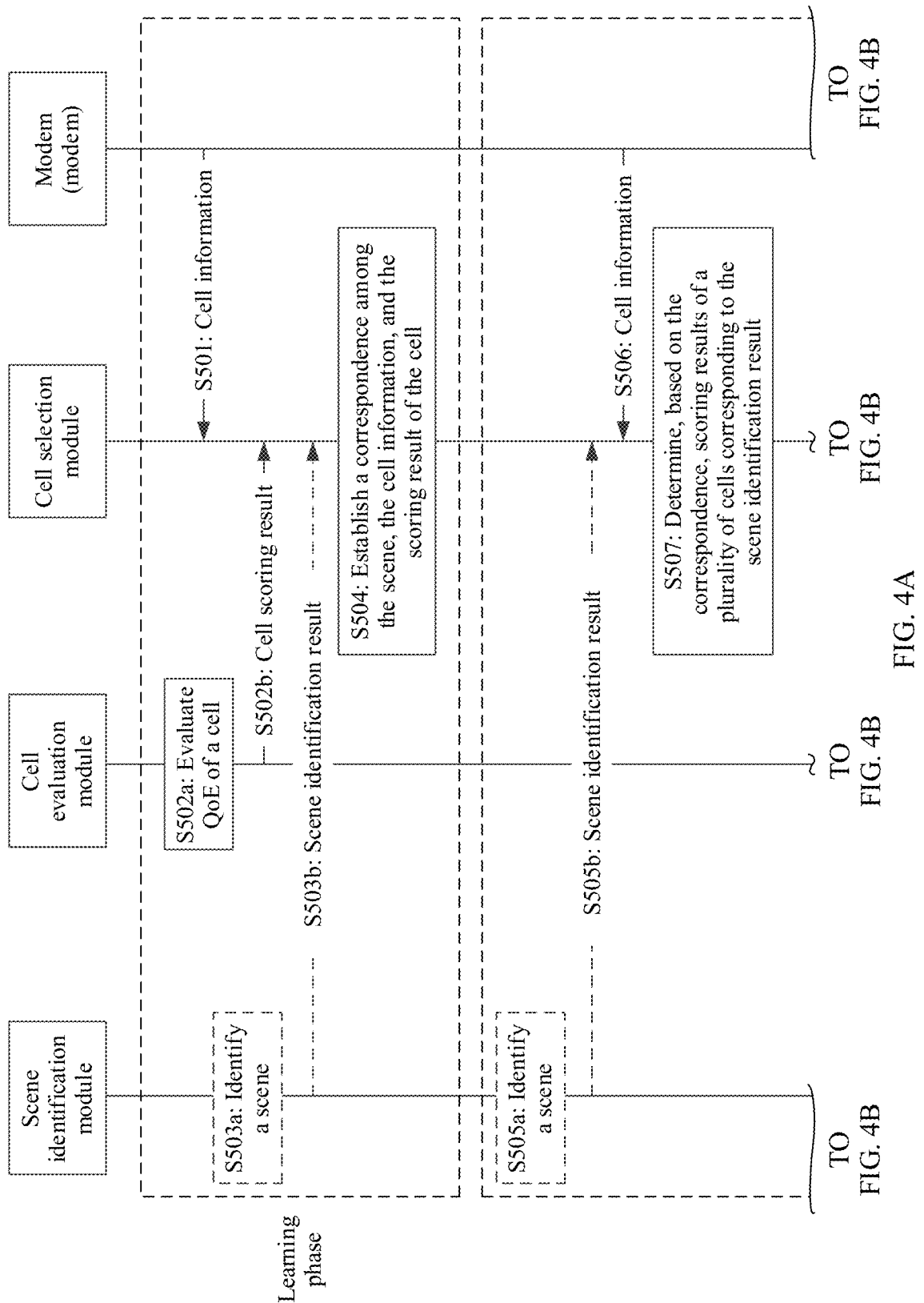
FIG. 4A to FIG. 4C are a schematic flowchart of another cell selection method according to an embodiment of this application.
Figure 4B:
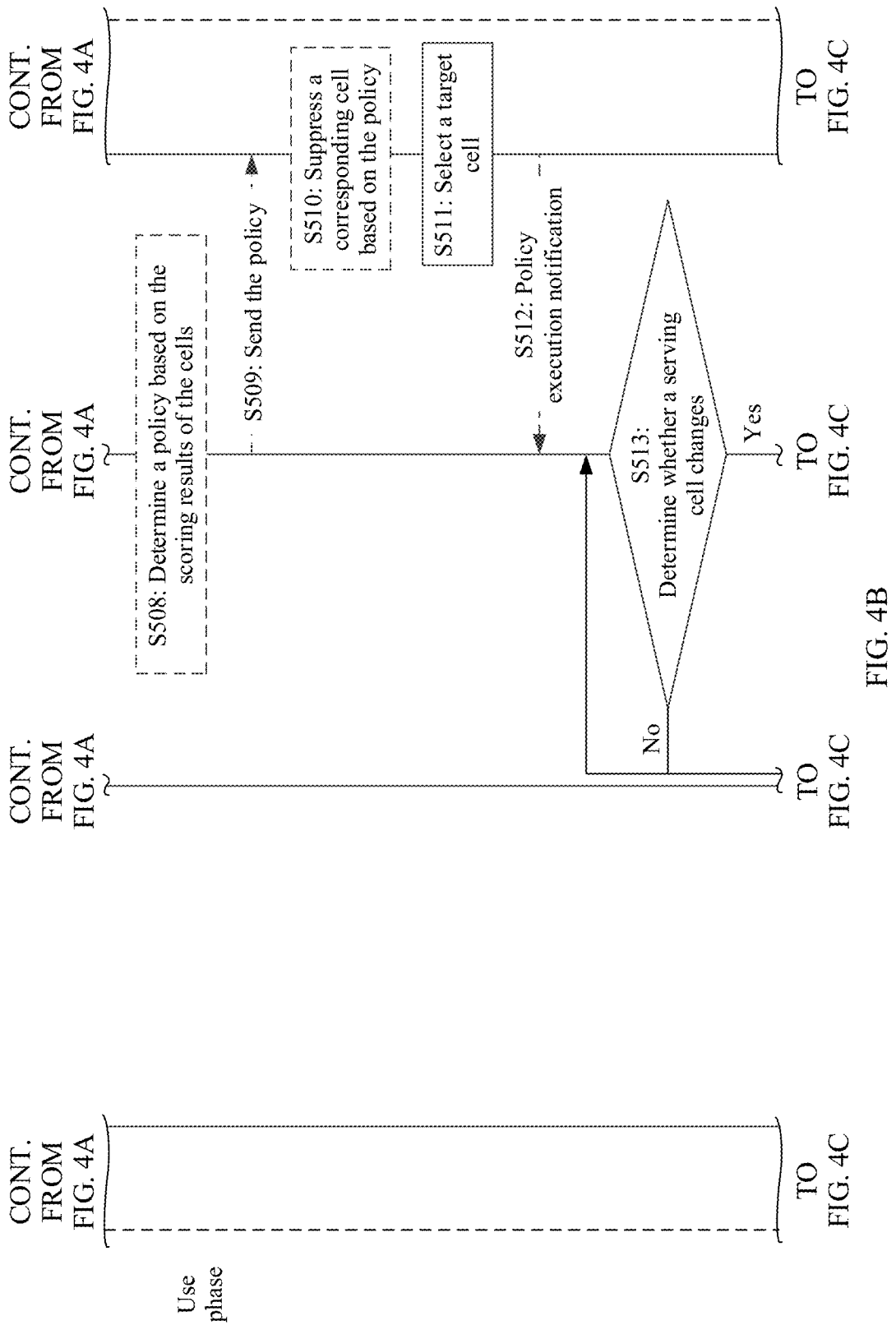
Figure 4C:
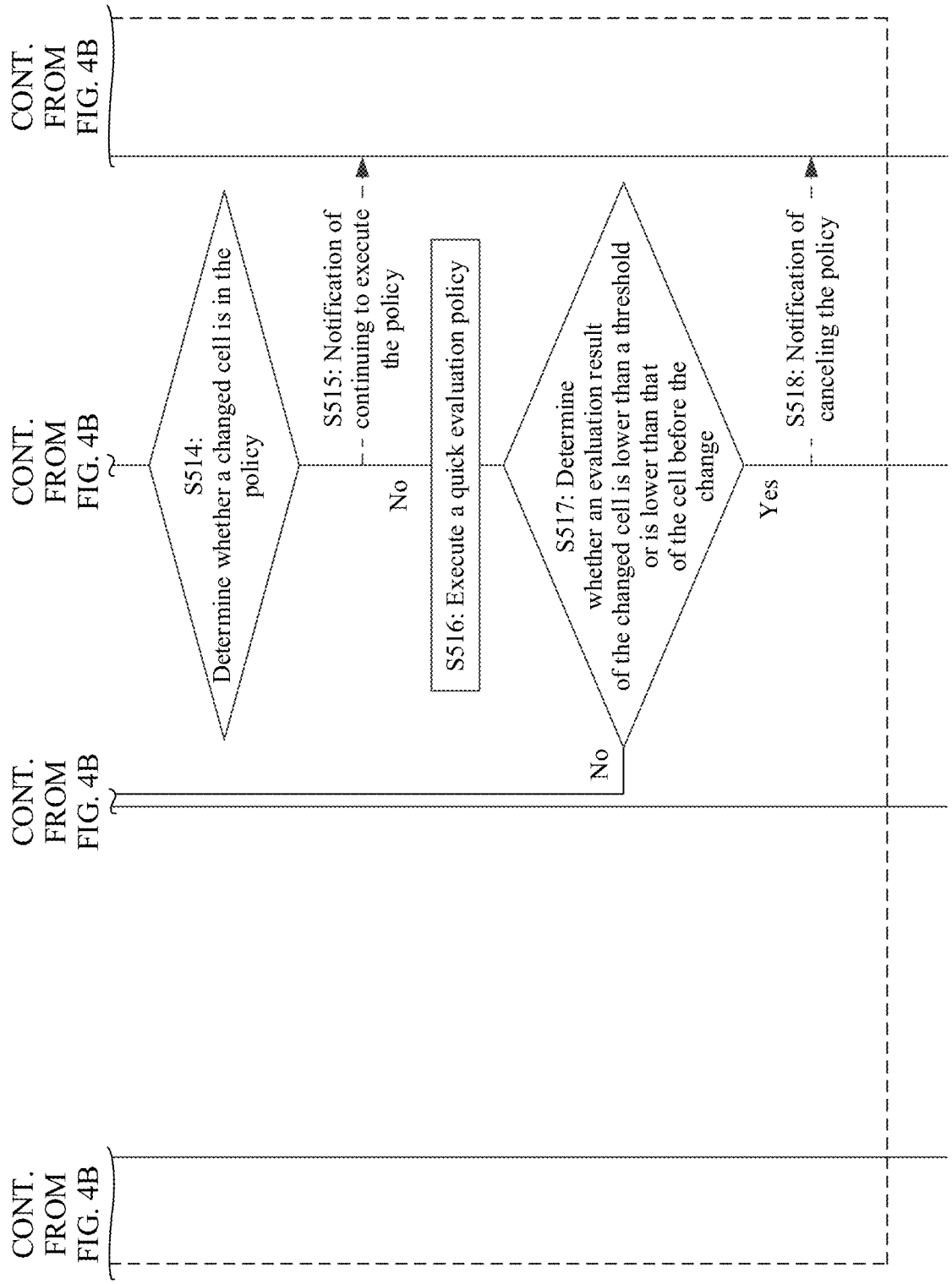

FIG. 4A to FIG. 4C are a schematic flowchart of a cell selection method according to an embodiment of the application. The procedure may also be understood as an information exchange process between different modules in a terminal device. The terminal device includes: a modem, configured to transmit data to another device such as a network device; a scene identification module, configured to identify a scene; a cell evaluation module, configured to evaluate a cell, for example, determine a scoring result of the cell; and a cell selection module, configured to select a target cell. Any two or more of the scene identification module, the cell evaluation module, and the cell selection module may be integrated into one physical device (for example, an application processor), or the scene identification module, the cell evaluation module, and the cell selection module are separately located in different physical devices. This is not limited in an embodiment of the application.

As shown in FIG. 4A to FIG. 4C, a procedure of the method includes the following operations:

S501: The modem sends cell information to the cell selection module. The cell information may be information about a serving cell of the terminal device, for example, including a cell identifier and signal strength. It may be understood that, before operation S501, an operation that the modem detects the cell information is further included. For example, the modem receives a system message broadcast by the serving cell, where the system message includes the information about the serving cell.

S502: The cell evaluation module evaluates QoE of a cell to obtain a scoring result, and sends the scoring result to the cell selection module. S502 includes S502a and S502b. For a learning process of the cell evaluation module, refer to the description in Embodiment 1.

S503: The scene identification module identifies a scene, and sends a scene identification result to the cell selection module. S503 includes S503a and S503b. For an identification process of a scene corresponding to the scene identification module, refer to 1.4 in Embodiment 1. Details are not described herein again. Operation S503 is an optional operation. Because the terminal device may not need to identify a scene, for example, learn each accessed cell, operation S503 is represented by a dashed line in the figure. An execution sequence of operations S501 to S503 is not limited in an embodiment of the application.

S504: The cell selection module establishes a correspondence among the scene, the cell information, and the scoring result of the cell. In an embodiment, the correspondence may further include a time period. For example, the correspondence is the correspondence shown in Table 14.

The foregoing operations S501 to S504 may be understood as a learning phase of the terminal device, that is, a phase of learning a score of a cell. Therefore, S501 to S503 may be performed for a plurality of times. In this way, the cell selection module may obtain a learning result of each cell in a plurality of scenes, for example, the correspondence shown in Table 14.

The following S505 to S516 may be understood as a phase of using the cell learning result.

For example, when detecting that the terminal device jumps from one time period to another time period (for example, jumps from 8:00-9:00 to 9:00-10:00), the terminal device enters a "use phase", and the terminal device performs scene identification and cell information detection. If it is determined that a learning result of the detected cell in a current time period exists in stored cell learning results, a policy is generated and sent to the modem, so that the modem executes the policy. For details, refer to the following descriptions of S505 to S516.

S505: The scene identification module identifies a scene, and sends a scene identification result to the cell selection module. S505 includes S505a and S505b.

S506: The modem sends cell information to the cell selection module. It should be understood that, before operation S506, the modem may perform cell measurement to obtain the cell information. The cell information may include information about a serving cell, and may further include information about a neighboring cell. For example, the terminal device currently camps on a cell A, and detects that neighboring cells include a cell B and a cell C. In this case, the cell information may include information about the cell A, the cell B, and the cell C. It should be noted that cell information in operation S506 in the use phase may be different from cell information in operation S501 in the learning phase. The cell information in the learning phase, that is, operation S501, may be the information about the serving cell of the terminal device, because the terminal device needs to learn QoE of the serving cell in the learning phase. However, the cell information in the use phase, that is, operation S506, may include the information about the serving cell or the information about the neighboring cell, because the terminal device expects to select, based on QoE learning results of the serving cell and the neighboring cell, a proper cell for access in the use phase.

S507: The cell selection module determines, from the foregoing correspondence, a plurality of cells corresponding to the scene, and determines scoring results corresponding to the plurality of cells. For example, the scene is "home". It is assumed that there are five cells corresponding to the scene stored in the correspondence. For example, the cell information includes the cell A, the cell B, and the cell C. The terminal device determines, in the five cells, scoring results corresponding to the cell A, the cell B, and the cell C.

S508: The cell selection module determines a policy based on the scoring results. The policy may be a suppression policy, that is, the cell selection module may determine, based on a correspondence (as shown in Table 16) between a scoring result and a suppression level, a suppression level corresponding to a cell, that is, the suppression policy includes the suppression level corresponding to the cell. Table 20 is an example of a policy (suppression policy) determined by the cell selection module.

TABLE 20

| | Policy | | | |
|---|---|---|---|---|
| Cell | RSRP Index | RSRQ Index | Score/Stalling rate | Suppression level |
| Cell A | Good | Good | 90 points | −0 dbm to −3 dbm |
| Cell B | Poor | Poor | 70 points | −10 dbm to −20 dbm |
| Cell C | Excellent | Excellent | 100 points | −0 dbm |

In an embodiment, the suppression policy may be replaced with an enhancement policy. For details, refer to the foregoing description.

S509: The cell selection module sends the determined policy to the modem. Assumed that the policy is Table 16, the cell selection module may send the foregoing table to the modem.

In an embodiment, before sending the policy to the modem, the cell selection module may determine whether a condition is met, and if a condition is met, send the policy, or otherwise, not send the policy. The condition includes at least one of the following:

It is determined that a current scene matches a scene in the foregoing correspondence, for example, Table 14;

a total quantity of QoE statistics collection times is greater than a threshold, where the total quantity of QoE statistics collection times is a sum of cumulative historical stalling times, cumulative historical smoothness times, and cumulative historical average times; or a quantity of cumulative days exceeds a quantity of days, where the cumulative days may refer to the description in 1.3 in Embodiment 1.

S510: The modem suppresses a corresponding cell based on the execution policy. It may be understood that, if the policy determined in S508 is the suppression policy, a measurement result of the cell is suppressed; or if the policy determined in S508 is the enhancement policy, a measurement result of the cell is enhanced. Using the suppression policy as an example, the modem may detect measurement results of the cell A, the cell B, and the cell C. After receiving the policy, the modem suppresses the measurement result of the cell A based on the suppression level of the cell A, suppresses the measurement result of the cell B based on the suppression level of the cell B, and suppresses the measurement result of the cell C based on the suppression level of the cell C (for a suppression process, refer to Embodiment 2), to obtain suppressed measurement results of the cell A, the cell B, and the cell C, as shown in Table 17.

S511: The modem selects a target cell. That is, the modem selects the target cell based on the suppressed measurement results of the cell A, the cell B, and the cell C. For content, refer to the description in Embodiment 2.

It should be noted that operations S508 to S510 are optional operations. After performing operation S507, the terminal device may directly send the scoring results corresponding to the cells to the modem. Therefore, an operation "the cell selection module sends the scoring results corresponding to the cells to the modem" may be used to replace operations S508 to S510. In this case, that the modem selects a target cell in S511 may mean selecting the target cell based on a scoring result corresponding to a second cell, for example, selecting a cell whose scoring result is the highest. There is no need to suppress a measurement result of the cell.

S512: The modem sends, to the cell selection module, a notification used to indicate policy execution. Operation S512 is an optional operation, and may not be performed.

In some embodiments, the terminal device may monitor a cell change within time T, and if a changed cell is not in a learning result, execute a quick evaluation policy on the changed cell to determine whether to cancel the policy. A time slice length >T>0, and the time slice length is the time period in Embodiment 1. For example, the quick evaluation policy is used to calculate an evaluation result of the changed cell. If the evaluation result is relatively poor, the policy (such as the suppression policy) is canceled. That the evaluation result of the changed cell is relatively poor includes: a score or a stalling rate of the changed cell is greater than a threshold or is higher than that of the cell before the change. This indicates that QoE of the cell after the handover is relatively poor. In this case, the suppression policy may be canceled. For details, refer to S513 to S518 below.

S513: The cell selection module determines whether the serving cell changes, and if the serving cell changes, performs S514, or if the serving cell does not change, continues to perform S513. When the serving cell of the terminal device changes in real time, a change status of the serving cell may be detected.

S514: The cell selection module determines whether the changed cell is in the policy, and if the changed cell is not in the policy, performs S515, or if the changed cell is in the policy, performs S515. There is a case in which the serving cell of the terminal device changes from the cell A to a cell D, but the cell D does not exist in the foregoing policy. Table 16 is used as an example. The policy includes learning results of the cell A, the cell B, and the cell C, but does not include a learning result of the cell D (for example, the terminal device has not learned QoE of the cell D, and therefore, there is no learning result of the cell D in the foregoing policy). In this case, the terminal device may perform the quick evaluation policy, that is, S516.

S515: The cell selection module sends, to the modem, a notification message for continuing to execute the policy.

S515 is an optional operation, and may be performed or may not be performed. For example, when the modem does not receive a policy cancellation notification, the modem continues to perform the policy by default. In this case, S515 may not be performed.

S516: The cell selection module executes the quick evaluation policy. For a process of executing the quick evaluation policy, refer to Embodiment 2. Details are not described herein again.

S517: The cell selection module determines whether the evaluation result of the changed cell is lower than a threshold or is lower than that of the cell before the change. If the evaluation result of the changed cell is lower than a threshold or is lower than that of the cell before the change, perform S518; or otherwise, perform S513. The evaluation result includes a score or a stalling rate. Therefore, that the evaluation result of the changed cell is lower than a threshold or is lower than that of the cell before the change includes: determining, by using the quick evaluation policy, that a score of the changed cell is lower than a threshold or is lower than a score of the cell A; or determining, by using the quick evaluation policy, that a stalling rate of the changed cell is higher than a threshold or is higher than a stalling rate of the cell A. It should be understood that, in addition to the score or the stalling rate, the evaluation result may further include a smoothness rate. Therefore, that the evaluation result of the changed cell is lower than a threshold or is lower than that of the cell before the change may further include that a smoothness rate of the changed cell is lower than a threshold or is lower than a smoothness rate of the cell before the change.

S518: The cell selection module sends, to the modem, a notification used to indicate to cancel the policy.

The foregoing example is still used as an example. The serving cell of the terminal device changes from the cell A to the cell D, but the cell D does not exist in the foregoing policy. When an evaluation result (for example, a score or a stalling rate) of the cell D is lower than a threshold or is lower than that of the cell A, if the modem continues to execute the policy, measurement results of the cell A to the cell C are always suppressed. If the terminal device selects the target cell based on the suppressed measurement result, the target cell cannot be restored to the cell A to the cell C as soon as possible. Therefore, the cell selection module notifies the modem to cancel execution of the policy.

It should be noted that, if the policy determined in S508 is the "enhancement policy", the foregoing solution may be replaced as follows: The cell selection module may cancel the enhancement policy when determining that the evaluation result of the changed cell is higher than a threshold or is higher than that of the cell before the change. When QoE of the changed cell is relatively good, if the enhancement policy continues to be executed, and the cell is selected based on the enhanced measurement result, the cell may be handed over to another cell. To avoid this case, the enhancement policy may be canceled. That the evaluation result of the changed cell is higher than a threshold or is higher than that of the cell before the change includes: a score of the changed cell is higher than a threshold or is higher than a score of the cell before the change, or a stalling rate of the changed cell is lower than a threshold or is lower than a stalling rate of the cell before the change, or a smoothness rate of the changed cell is higher than a threshold or is higher than a smoothness rate of the cell before the change.

It may be understood that, after operation S518, another operation may be further included. For example, the modem cancels execution of the policy. Certainly, that the modem sends, to the cell selection module, a notification indicating that execution of the policy has been canceled, and the like may be further included.

In some embodiments, a cell whose evaluation result is lower than a threshold may be served as a black cell. The black cell may be understood as that the terminal device is not handed over to the cell, or may be understood as a cell added to a blacklist. The cell whose evaluation result is lower than the threshold includes: a cell whose score is lower than the threshold, a cell whose stalling rate is higher than the threshold, or a cell whose smoothness rate is lower than the threshold.

Embodiment 6

Figure 5A:
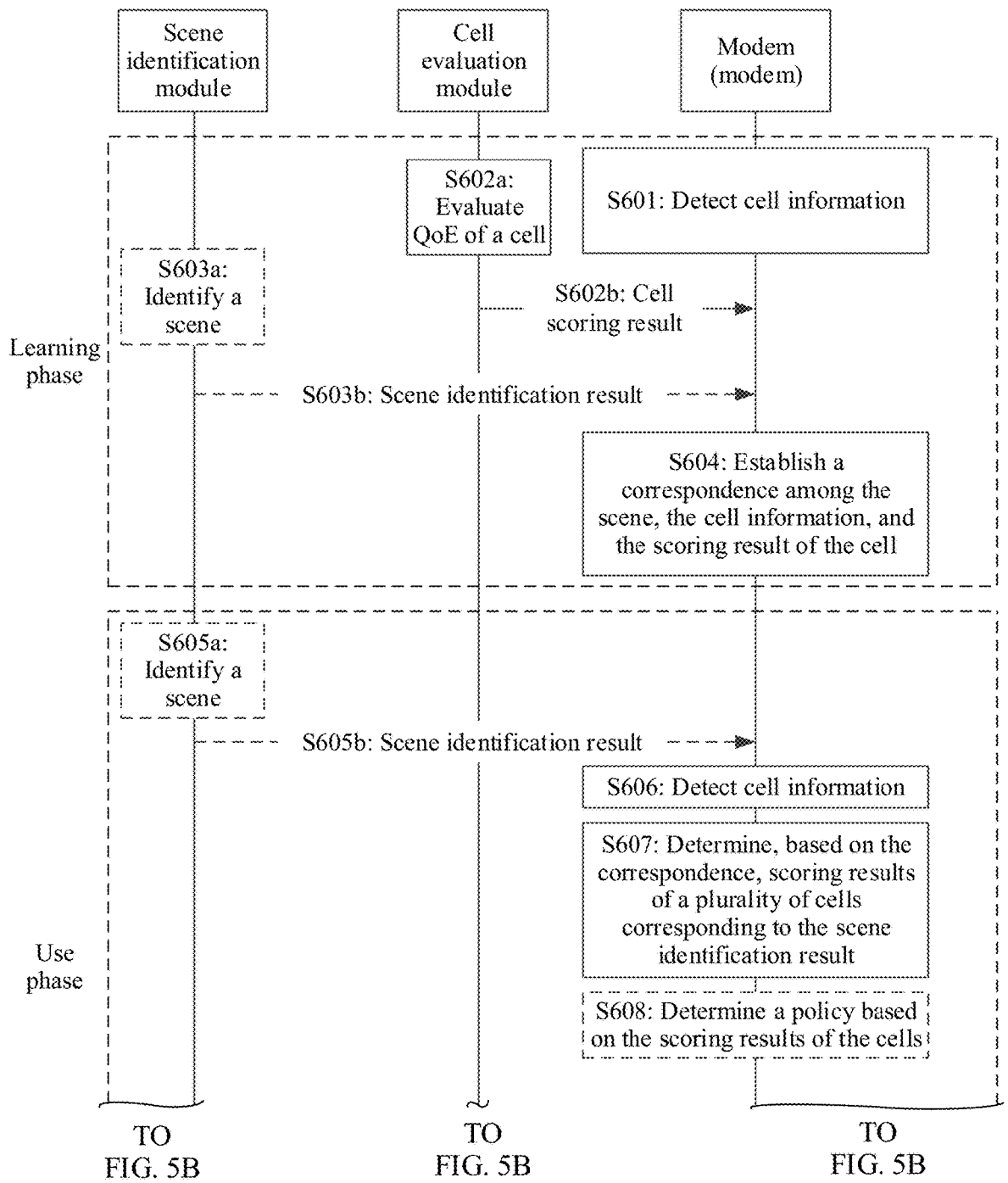
FIG. 5A and FIG. 5B are a schematic flowchart of still another cell selection method according to an embodiment of this application.
Figure 5B:
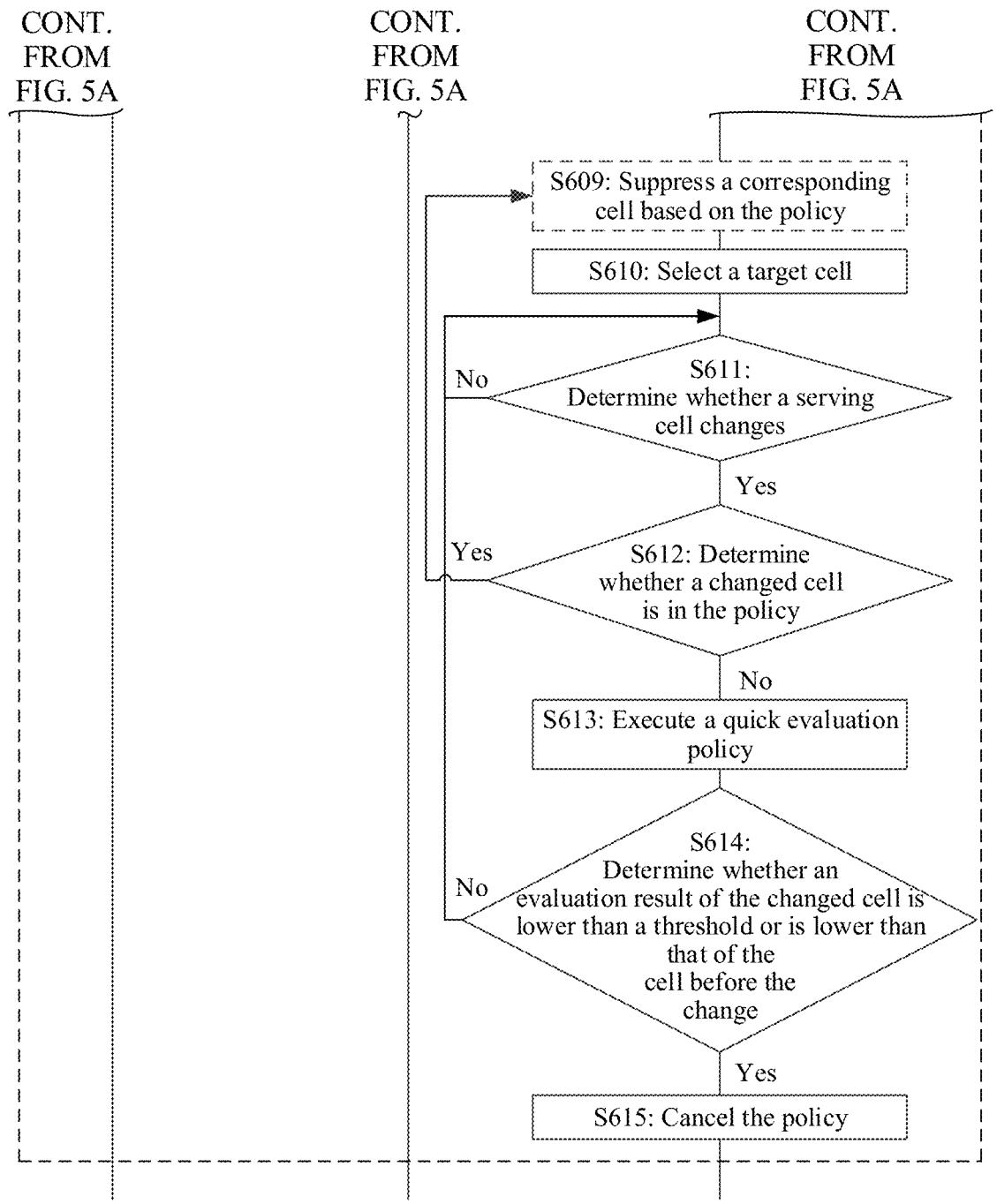

Refer to FIG. 5A and FIG. 5B. A difference between this embodiment and the embodiment shown in FIG. 4A to FIG. 4C lies in that the cell selection module in FIG. 4A to FIG. 4C is integrated in a modem, that is, a function of the cell selection module is executed by the modem. A scene identification module and a cell evaluation module may be located in a same component, for example, an application processor, or may be located in different components. This is not limited in an embodiment of the application.

As shown in FIG. 5A and FIG. 5B, the procedure includes the following operations.

S601: The modem detects cell information.

S602: The cell evaluation module evaluates QoE of a cell to obtain a scoring result, and sends the scoring result to the modem. S602 includes S602a and S602b.

S603: The scene identification module identifies a scene, and sends a scene identification result to the cell selection module. S603 includes S603a and S603b.

Operation S603 is an optional operation. An execution sequence of operations S601 to S603 is not limited in an embodiment of the application.

S604: The modem establishes a correspondence among the scene, the cell information, and the scoring result of the cell.

S605: The scene identification module identifies a scene, and sends a scene identification result to the modem. S605 includes S605a and S605b.

S606: The modem detects cell information.

S607: The modem determines, from the foregoing correspondence, a plurality of cells corresponding to the scene, and determines scoring results corresponding to the plurality of cells.

S608: The modem determines a policy based on the scoring results.

S609: The modem suppresses a corresponding cell based on the policy.

S610: The modem selects a target cell.

Operations S608 and S609 are optional operations. After performing operation S607, the terminal device may directly perform S610. In this case, that the modem selects a target cell in S610 may mean selecting the target cell based on a scoring result corresponding to a cell, for example, selecting a cell whose scoring result is the highest. There is no need to suppress a policy result of the cell.

S611: The modem determines whether a serving cell changes, and if the serving cell changes, performs operation S612, or if the serving cell does not change, continues to perform operation S611.

S612: The modem determines whether a changed cell is in the policy, and if the changed cell is not in the policy, performs operation S613, or if the changed cell is in the policy, performs S609 or S610.

S613: The modem executes a quick evaluation policy.

S614: The modem determines whether an evaluation result of the changed cell is lower than a threshold or is lower than that of the cell before the change, and if yes, performs S615, or if no, performs S611.

S615: The modem cancels execution of the policy.

Embodiment 7

Data transmission between two devices is layer-by-layer transmission. For example, a protocol layer of a device A includes four layers: an application (app) layer, a transport layer such as a transmission control protocol (TCP) layer, a network layer, and a data link layer. A process in which the device A sends data includes: sending data from the application layer of the device A to the transport (TCP) layer, sending the data to the network layer through the TCP layer, then sending the data to the data link layer through the network layer, and finally sending the data out through the data link layer. A process in which the device A receives data includes: receiving data through the data link layer, transmitting the data to the network layer, then transmitting the data to the TCP layer, and finally transmitting the data to the application layer.

In Embodiment 1, an evaluation indicator of QoE of a cell includes a delay, a transmission rate, and the like. Using a delay as an example, the delay may be a delay at the application layer, a delay at the TCP layer, a delay at the network layer, a delay at the data link layer, or the like. The delay at the application layer may be time in which data is transmitted from an application layer of a transmit end to an application layer of a receive end; or time in which the data is transmitted from an application layer of a transmit end to an application layer of a receive end plus time in which the data is transmitted from the application layer of the receive end to the application layer of the transmit end. The delay at the TCP layer is used as an example. The delay at the TCP layer may be time in which data is transmitted from a TCP layer of a transmit end to a TCP layer of a receive end; or time in which the data is transmitted from a TCP layer of a transmit end to a TCP layer of a receive end plus time in which the data is transmitted from the TCP layer of the receive end to the TCP layer of the transmit end.

Figure 6A:
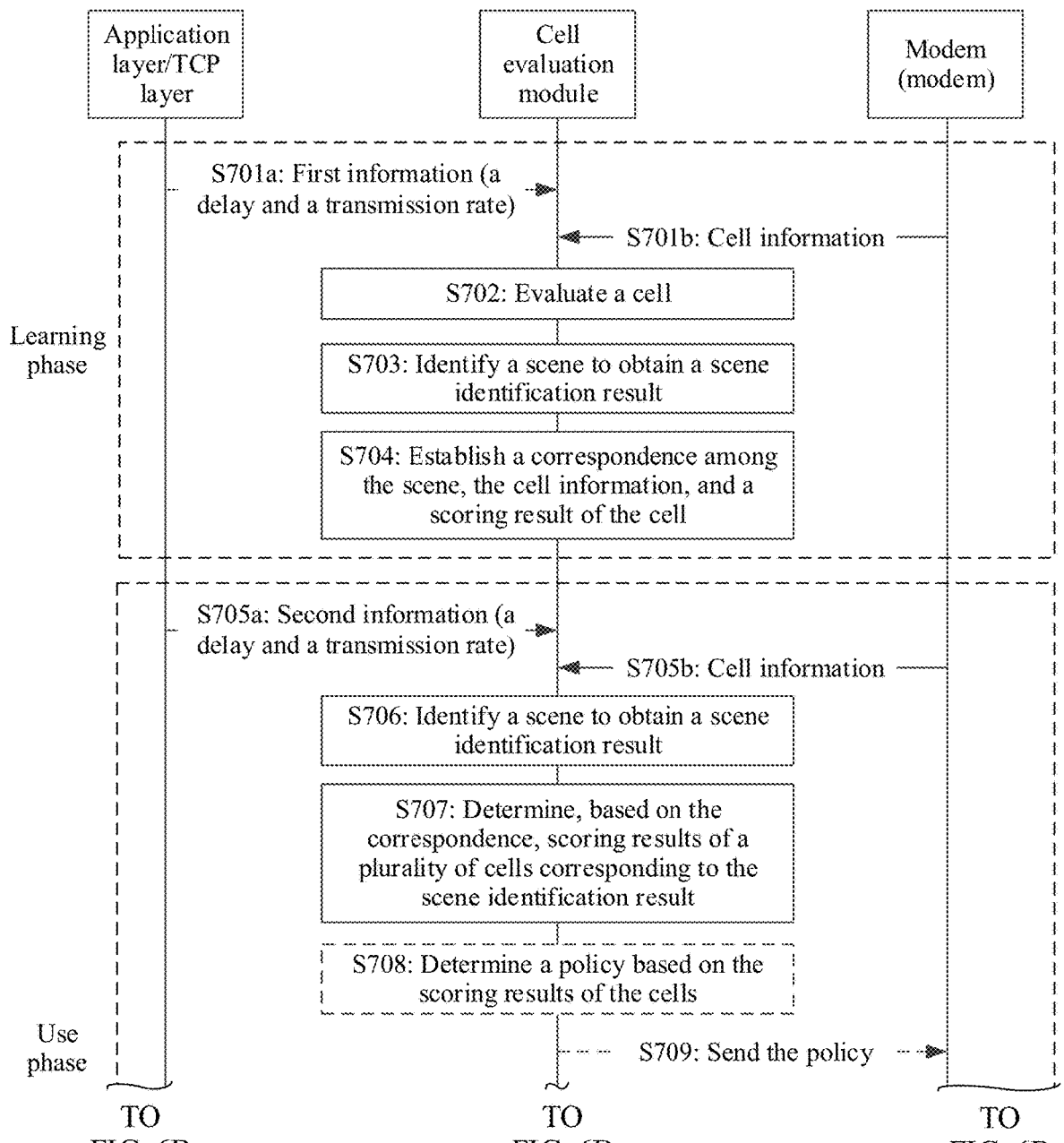
FIG. 6A and FIG. 6B are a schematic flowchart of yet another cell selection method according to an embodiment of this application.
Figure 6B:
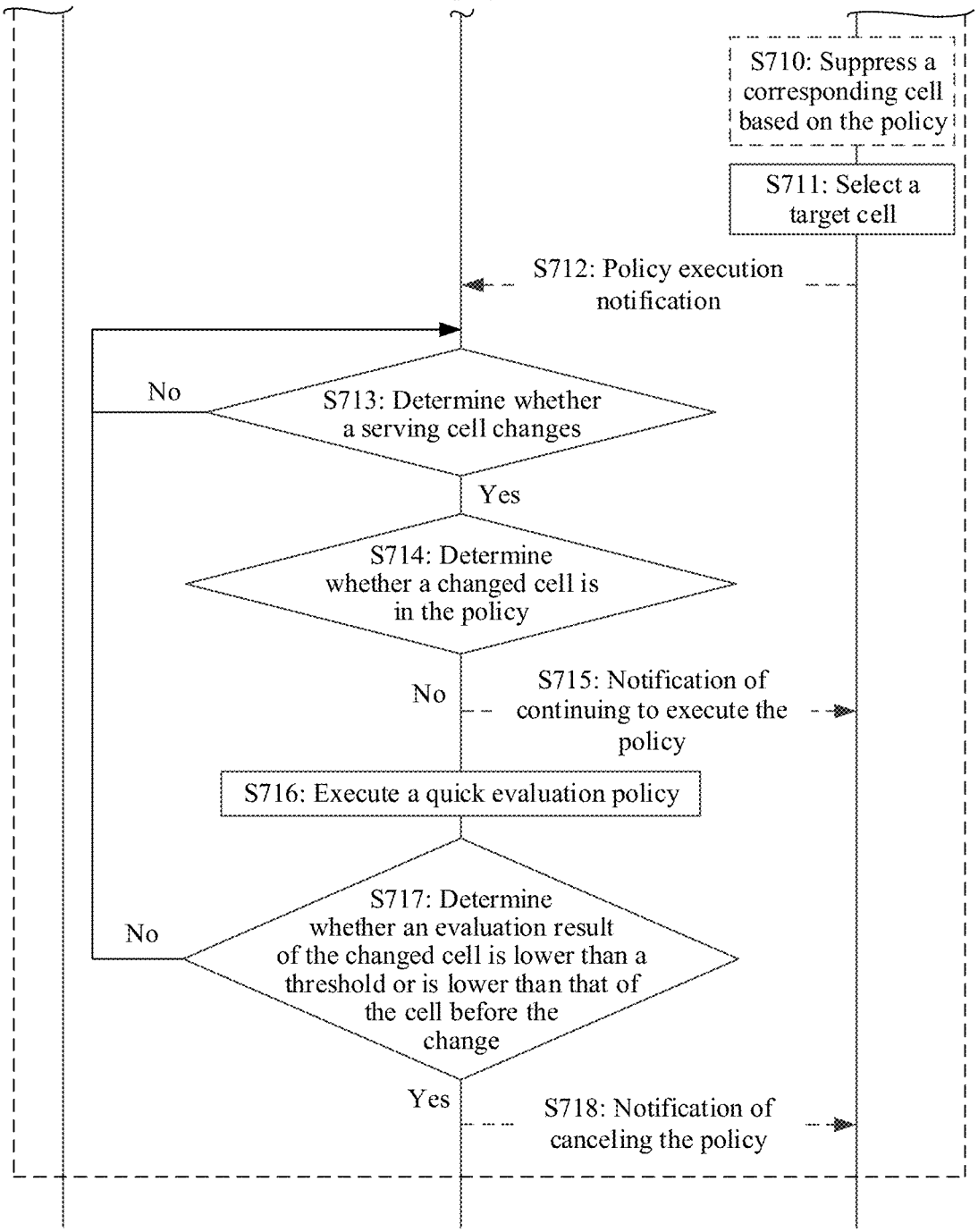

FIG. 6A and FIG. 6B are a schematic flowchart of a cell selection method according to an embodiment of the application. The procedure includes:

S701a: The application layer or the TCP layer sends first information to a cell evaluation module.

The first information may include a delay, a transmission rate, and the like. The delay may be the delay at the application layer, or may be the delay at the TCP layer. The transmission rate may be a transmission rate at the application layer, or may be a transmission rate at the TCP layer. The first information may be used to evaluate QoE of a cell.

Operation S701a is an optional operation, because the terminal device may further evaluate QoE of a cell by using a delay, a transmission rate, and the like at the data link layer.

S701b: A modem sends cell information to the cell evaluation module. The cell information is information about a serving cell of the terminal device. In an embodiment, the modem may further send, to the cell evaluation module, a delay, a transmission rate, and the like that are detected by the modem, where the delay and the transmission rate at the data link layer may be included.

S702: The cell evaluation module evaluates the cell to obtain a scoring result of the cell.

The cell evaluation module may evaluate the cell based on the first information. For example, if a delay in the first information is relatively low, the cell is evaluated as stalling; or if a delay in the first information is relatively high, the cell is evaluated as smooth. Additionally/alternatively, when S701b includes the delay and the transmission rate that are detected by the modem, the cell may be further evaluated based on the delay and the transmission information in S701b. For example, if the delay is relatively low, the cell is evaluated as stalling; or if the delay is relatively high, the cell is evaluated as smooth.

S703: The cell evaluation module identifies a scene to obtain a scene identification result.

S704: The cell evaluation module establishes a correspondence among the scene, the cell information, and the scoring result of the cell.

S701 to S704 may be understood as a learning phase of the terminal device. Therefore, S701 to S704 may be performed for a plurality of times. For example, each time S701 to S704 are performed, an evaluation result of one cell may be detected. Therefore, the terminal device may obtain scoring results of a plurality of cells in different scenes.

S705a: The application layer or the TCP layer sends second information to the cell evaluation module.

The second information may include a delay, a transmission rate, and the like. The delay may be the delay at the application layer, or may be the delay at the TCP layer. The transmission rate may be a transmission rate at the application layer, or may be a transmission rate at the TCP layer.

S705b: The cell evaluation module receives cell information from the modem, where the cell information may include information about a serving cell, or may include information about a neighboring cell. In an embodiment, S705b may further include the delay and the transmission rate that are detected by the modem, where the delay and the transmission rate at the data link layer may be included.

It should be noted that operation S705a is an optional operation. Because the second information is a delay, a transmission rate, and the like in a use phase, and S701a shows a delay, a transmission rate, and the like in a learning phase, the first information is historical information, and the third information is current information. Therefore, if S705a is performed, the terminal device may perform comprehensive evaluation based on the historical information and the current information (refer to the process of determining a comprehensive evaluation result based on a current evaluation result and a historical evaluation result in Embodiment 1). Certainly, S705a may also be not performed.

S706: The cell evaluation module identifies a scene to obtain a scene identification result.

S707: The cell evaluation module determines, from the foregoing correspondence, a plurality of cells corresponding to the scene, and determines scoring results corresponding to the plurality of cells.

S708: The cell evaluation module determines a policy based on the scoring results.

S709: The cell evaluation module sends the policy to the modem.

S710: The modem suppresses a corresponding cell based on the policy.

S711: The modem selects a target cell.

S712: The modem sends, to the cell evaluation module, a notification used to indicate policy execution.

S713: The modem determines whether a serving cell changes, and if the serving cell changes, performs operation S714, or if the serving cell does not change, continues to perform operation S713.

S714: The modem determines whether a changed cell is in the policy, and if the changed cell is not in the policy, performs operation S715, or if the changed cell is in the policy, performs S715.

S715: The cell evaluation module sends, to the modem, a notification for continuing to execute the policy.

S716: The modem executes a quick evaluation policy.

S717: The modem determines whether an evaluation result of the changed cell is lower than a threshold or is lower than that of the cell before the change, and if yes, performs S718, or if no, performs S713.

S718: The cell evaluation module sends, to the modem, a notification used to indicate to cancel the policy.

Embodiment 7

A difference between this embodiment and the embodiment shown in FIG. 6A and FIG. 6B lies in that a cell selection module is integrated in a modem, that is, a function of the cell selection module in the embodiment shown in FIG. 6A and FIG. 6B is implemented by the modem.

Figure 7A:
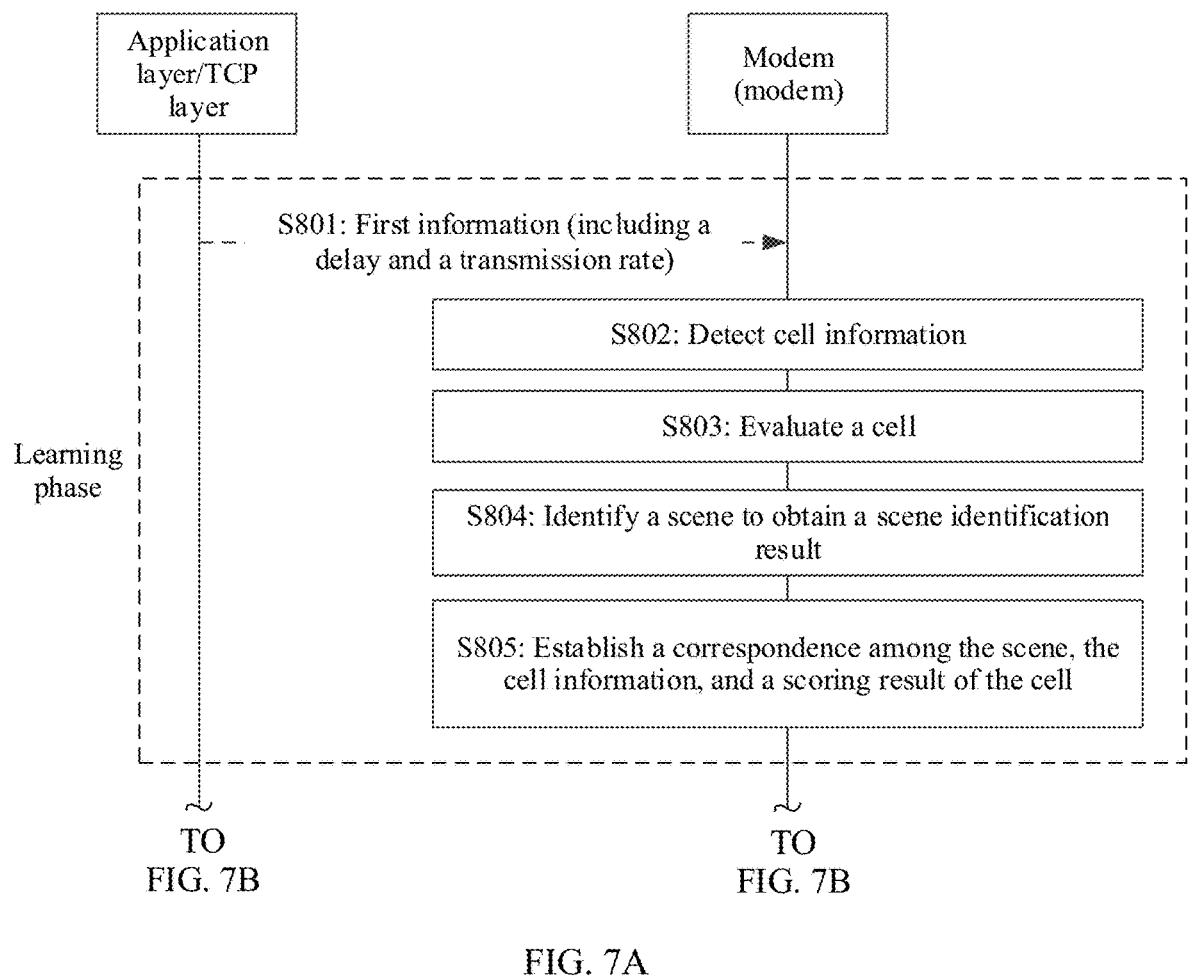
FIG. 7A and FIG. 7B are a schematic flowchart of still yet another cell selection method according to an embodiment of this application.
Figure 7B:
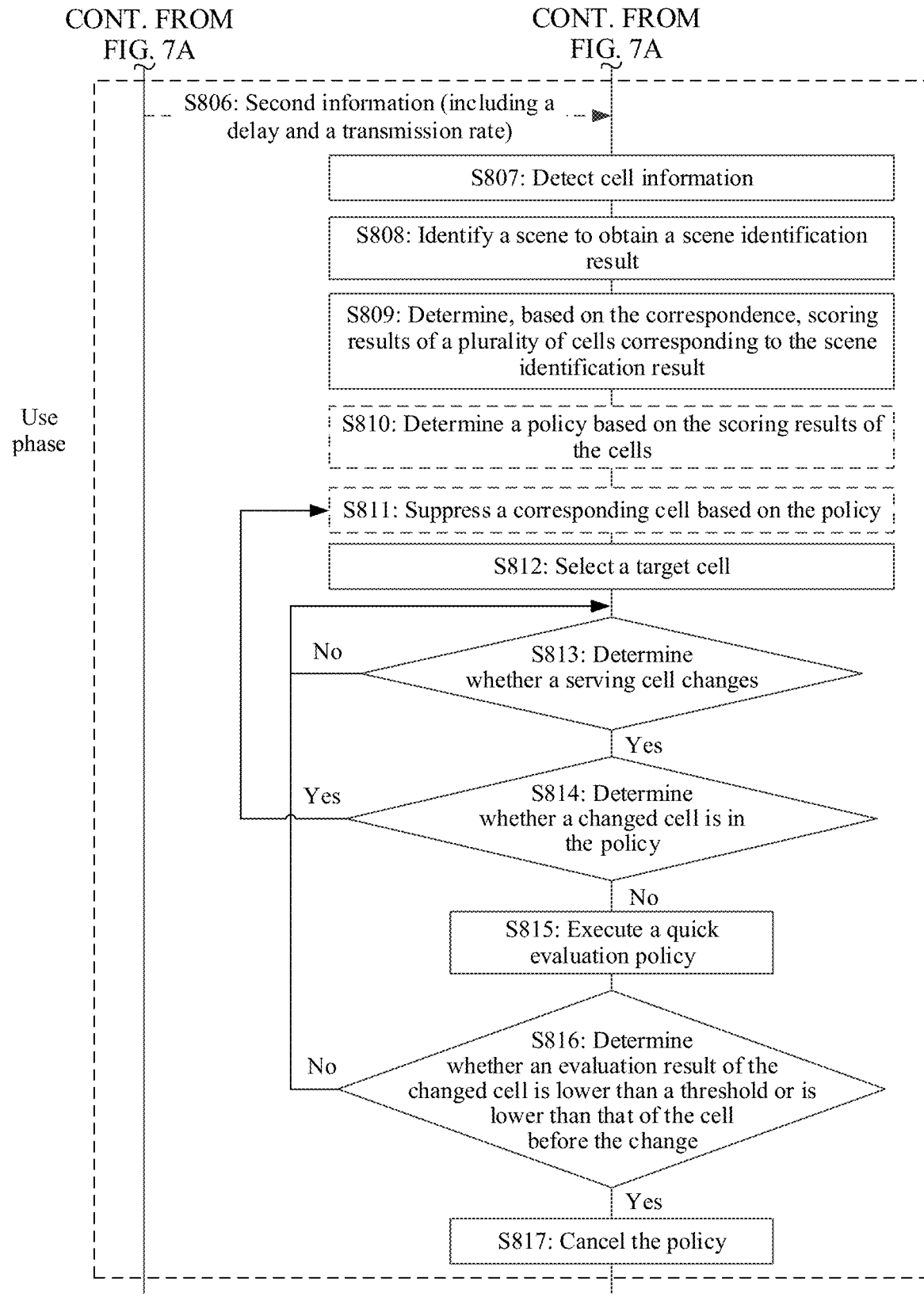

FIG. 7A and FIG. 7B are a schematic flowchart of a cell selection method according to an embodiment of the application. The procedure includes:

S801: An application layer or a TCP layer sends first information to the modem.

S802: The modem detects cell information.

S803: The modem evaluates a cell to obtain a scoring result of the cell.

S804: The modem identifies a scene to obtain a scene identification result.

S805: The modem establishes a correspondence among the scene, the cell information, and the scoring result of the cell.

S806: The application layer or the TCP layer sends second information to the modem.

S807: The modem detects cell information.

S808: The modem identifies a scene to obtain a scene identification result.

S809: The modem determines, from the foregoing correspondence, scoring results of a plurality of cells corresponding to the scene.

S810: The modem determines a policy based on the scoring results.

S811: The modem suppresses a corresponding cell based on the policy.

S812: The modem selects a target cell.

S813: The modem determines whether a serving cell changes, and if the serving cell changes, performs operation S814, or if the serving cell does not change, continues to perform operation S813.

S814: The modem determines whether a changed cell is in the policy, and if the changed cell is not in the policy, performs operation S815, or if the changed cell is in the policy, performs S811 or S812.

S815: The modem executes a quick evaluation policy.

S816: The modem determines whether an evaluation result of the changed cell is lower than a threshold or is lower than that of the cell before the change, and if yes, performs S817, or if no, performs S813.

S817: The modem cancels execution of the policy.

The following describes a terminal device provided in embodiments of this application.

Figure 8:
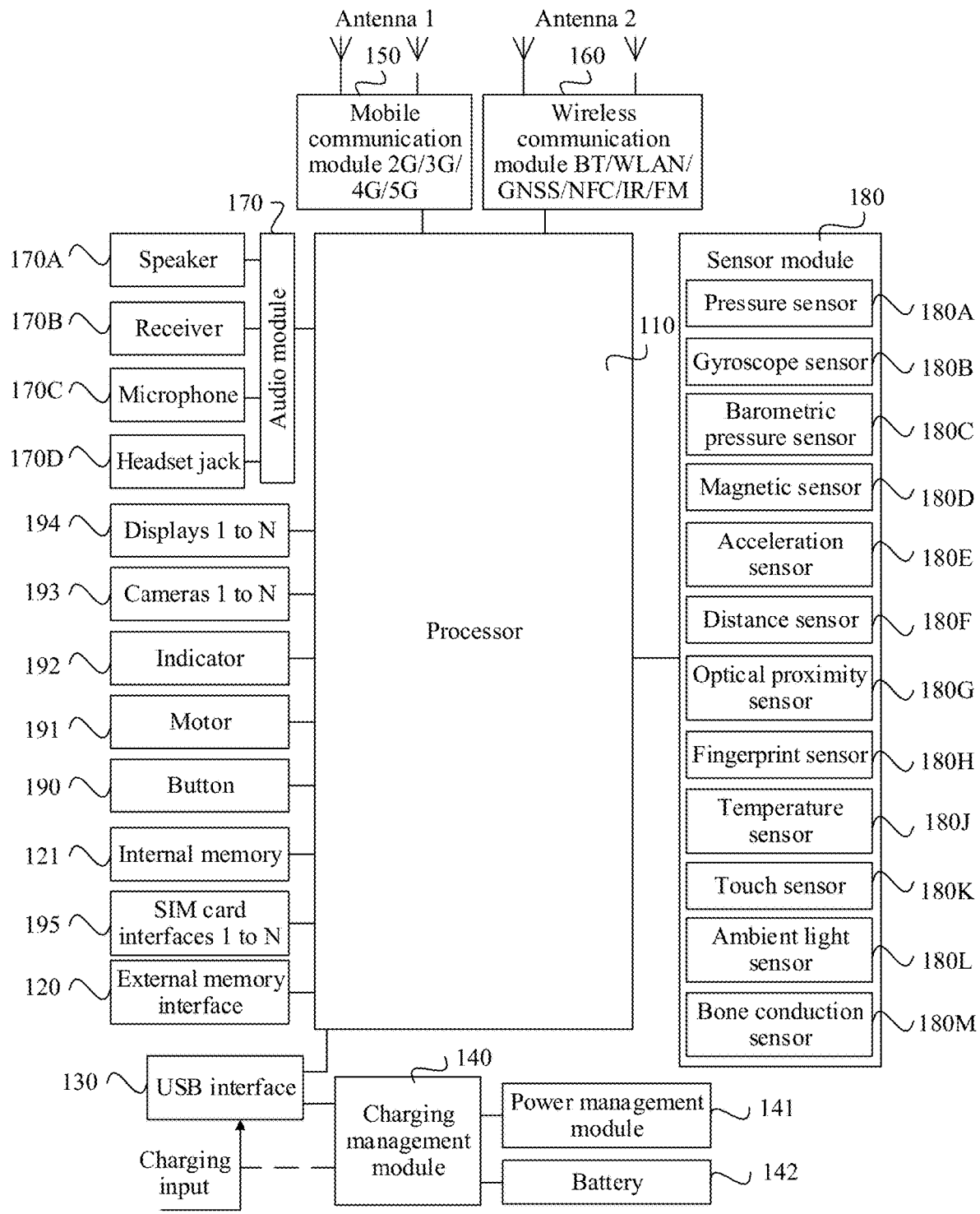
FIG. 8 is a schematic diagram of a structure of a terminal device according to an embodiment of this application.

FIG. 8 is a schematic diagram of a structure of a terminal device. As shown in FIG. 8, the terminal device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The processor 110 may include one or more processing units. For example, the processor 110 may include an application processor (AP), a modem, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the terminal device. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, an application processor and a modem are integrated into the processor 110. For functions of the application processor and the modem, refer to descriptions in FIG. 4A to FIG. 7B.

The USB interface 130 is an interface that conforms to a USB standard specification, and may be a mini USB interface, a micro USB interface, a USB Type C interface, or the like. The USB interface 130 may be configured to connect to a charger to charge the terminal device, or may be configured to transmit data between the terminal device and a peripheral device. The charging management module 140 is configured to receive a charging input from a charger. The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the terminal device may be implemented by using the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the terminal device may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that is applied to the terminal device and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The wireless communication module 160 may provide a solution, applied to the terminal device, to wireless communication including a wireless local area network (wireless local area network, WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device is coupled to the mobile communication module 150, and the antenna 2 is coupled to the wireless communication module 160, so that the terminal device may communicate with a network and other devices by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLO-NASS), a BeiDou navigation satellite system (BDS), a quasi-zenith satellite system (QZSS), and/or a satellite based augmentation system (SBAS).

The display 194 is configured to display a display interface of an application, for example, a viewfinder interface of a camera application. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal device may include one or N displays 194, where N is a positive integer greater than 1.

The terminal device may implement an image shooting function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of an image shooting scenario. In some embodiments, the ISP may be disposed in the camera 193.

The camera 193 is configured to capture a static image or a video. An optical image of an object is generated through the lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV.

In an embodiment of the application, the terminal device may include N cameras 193 (for example, arrayed cameras), where N is an integer greater than or equal to 2.

The digital signal processor is configured to process a digital signal, and may process another digital signal in addition to the digital image signal. For example, when the terminal device selects a frequency, the digital signal processor is configured to perform Fourier transformation on frequency energy.

The video codec is configured to compress or decompress a digital video. The terminal device may support one or more video codecs. In this way, the terminal device may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the terminal device, for example, image recognition, facial recognition, voice recognition, and text understanding, may be implemented through the NPU.

The internal memory 121 may be configured to store computer-executable program code. The executable program code includes instructions. The processor 110 runs the instructions stored in the internal memory 121, to perform various function applications and data processing of the terminal device. The internal memory 121 may include a program storage area and a data storage area. The program storage area may store an operating system, software code of at least one application program (such as iQIYI or WeChat), and the like. The data storage area may store data (for example, a shot image or a recorded video) or the like generated when the terminal device is used. In addition, the internal memory 121 may include a high-speed random access memory, or may include a nonvolatile memory, for example, at least one magnetic disk storage component, a flash memory, or a universal flash storage (UFS).

The external memory interface 120 may be configured to connect to an external storage card, for example, a micro SD card, to extend a storage capability of the terminal device. The external storage card communicates with the processor 110 through the external memory interface 120, to implement a data storage function. For example, a file such as a picture or a video is stored in the external storage card.

The internal memory 121 or the external memory may store one or more computer programs. The one or more computer programs include instructions. When the instructions are executed by the processor 110, the terminal device is enabled to perform the methods provided in FIG. 3 to FIG. 7B.

The terminal device may implement an audio function such as music playing and recording through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a body posture of the terminal device. In some embodiments, an angular velocity of the terminal device around three axes (namely, axes x, y, and z) may be determined by using the gyroscope sensor 180B.

The barometric pressure sensor 180C is configured to measure barometric pressure. In some embodiments, the terminal device calculates an altitude based on a barometric pressure value measured by the barometric pressure sensor 180C, to assist in positioning and navigation. The magnetic sensor 180D includes a Hall sensor. The terminal device may detect opening and closing of a flip leather case by using the magnetic sensor 180D. In some embodiments, when the terminal device is a flip phone, the terminal device may detect opening and closing of a flip cover by using the magnetic sensor 180D. Further, a feature such as automatic unlocking upon opening of the flip cover is set based on a detected opening or closing state of the flip cover. The acceleration sensor 180E may detect accelerations in various directions (usually on three axes) of the terminal device, and may detect a value and a direction of gravity when the terminal device is still. The acceleration sensor 180E may be further configured to identify a posture of the terminal device, and is applied to an application such as switching between a landscape mode and a portrait mode or a pedometer.

The distance sensor 180F is configured to measure a distance. The terminal device may measure a distance by using infrared light or a laser. In some embodiments, in an image shooting scenario, the terminal device may measure a distance by using the distance sensor 180F, to implement quick focusing. The optical proximity sensor 180G may include, for example, a light emitting diode (LED) and an optical detector such as a photodiode. The light emitting diode may be an infrared light-emitting diode. The terminal device emits infrared light outwards by using the light emitting diode. The terminal device detects infrared reflected light from a nearby object by using the photodiode. When adequate reflected light is detected, the terminal device may determine that there is an object near the terminal device. When inadequate reflected light is detected, the terminal device may determine that there is no object near the terminal device. The terminal device may detect, by using the optical proximity sensor 180G, that a user holds the terminal device close to an ear for a call, so that the terminal device automatically turns off the screen to save power. The optical proximity sensor 180G may also be used in a smart cover mode or a pocket mode to automatically perform screen unlocking or locking.

The ambient light sensor 180L is configured to sense ambient light brightness. The terminal device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device is in a pocket, to avoid an accidental touch. The fingerprint sensor 180H is configured to collect a fingerprint. The terminal device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device executes a temperature processing policy based on the temperature detected by the temperature sensor 180J. For example, when the temperature reported by the temperature sensor 180J exceeds a threshold, the terminal device lowers performance of a processor located near the temperature sensor 180J, to reduce power consumption to implement thermal protection. In some other embodiments, when the temperature is less than another threshold, the terminal device heats the battery 142 to prevent the terminal device from being abnormally powered off because of a low temperature. In some other embodiments, when the temperature is less than still another threshold, the terminal device boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided through the display 194. In some other embodiments, the touch sensor 180K may alternatively be disposed on a surface of the terminal device at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal.

The button 190 includes a power button, a volume button, and the like. The button 190 may be a mechanical button, or may be a touch button. The terminal device may receive a button input, and generate a button signal input related to a user setting and function control of the terminal device. The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. A touch vibration feedback effect may alternatively be customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the terminal device.

It may be understood that the components shown in FIG. 8 do not constitute a limitation on the terminal device. The mobile phone may further include more or fewer components than those shown in the figure, or combine some components, or split some components, or have different component arrangements. In addition, a combination/connection relationship between the components in FIG. 8 may also be adjusted and modified.

When the procedure shown in FIG. 4A to FIG. 4C is applied to the terminal device shown in FIG. 8, one or more of the scene identification module, the cell evaluation module, and the cell selection module may be integrated into the processor 110. For example, if the processor 110 integrates the application processor and the modem, one or more of the scene identification module, the cell evaluation module, and the cell selection module may be integrated into the application processor or the modem. Alternatively, the processor 110 is a general term of a plurality of processors in the terminal device, and the scene identification module, the cell evaluation module, and the cell selection module may be integrated into a same processor or different processors in the plurality of processors. The plurality of processors include, for example, an application processor, a modem, and a neural network processor.

When the procedure shown in FIG. 5A and FIG. 5B is applied to the terminal device shown in FIG. 8, one or more of the scene identification module and the cell evaluation module may be integrated into the processor 110. For example, if the processor 110 integrates the application processor and the modem, one or more of the scene identification module and the cell evaluation module may be integrated into the application processor or the modem. Alternatively, the processor 110 is a general term of a plurality of processors in the terminal device, and the scene identification module and the cell evaluation module may be integrated into a same processor or different processors in the plurality of processors. The plurality of processors include, for example, an application processor, a modem, and a neural network processor.

When the procedure shown in FIG. 6A and FIG. 6B is applied to the terminal device shown in FIG. 8, one or more modules of the application layer/TCP layer and the cell evaluation module may be integrated into the processor 110. For example, if the processor 110 integrates the application processor and the modem, one or more modules of the application layer/TCP layer and the cell evaluation module may be integrated into the application processor or the modem. For example, the application layer/TCP layer is integrated into the modem, and the cell evaluation module is integrated into the application processor. Alternatively, the processor 110 is a general term of a plurality of processors in the terminal device, and the application layer/TCP layer and the cell evaluation module may be integrated into a same processor or different processors in the plurality of processors. The plurality of processors include, for example, an application processor, a modem, and a neural network processor.

When the procedure shown in FIG. 7A and FIG. 7B is applied to the terminal device shown in FIG. 8, the application layer/TCP layer may be integrated into the processor 110. For example, if the processor 110 integrates the application processor and the modem, the application layer/TCP layer is integrated into the application processor or the modem.

Figure 9:
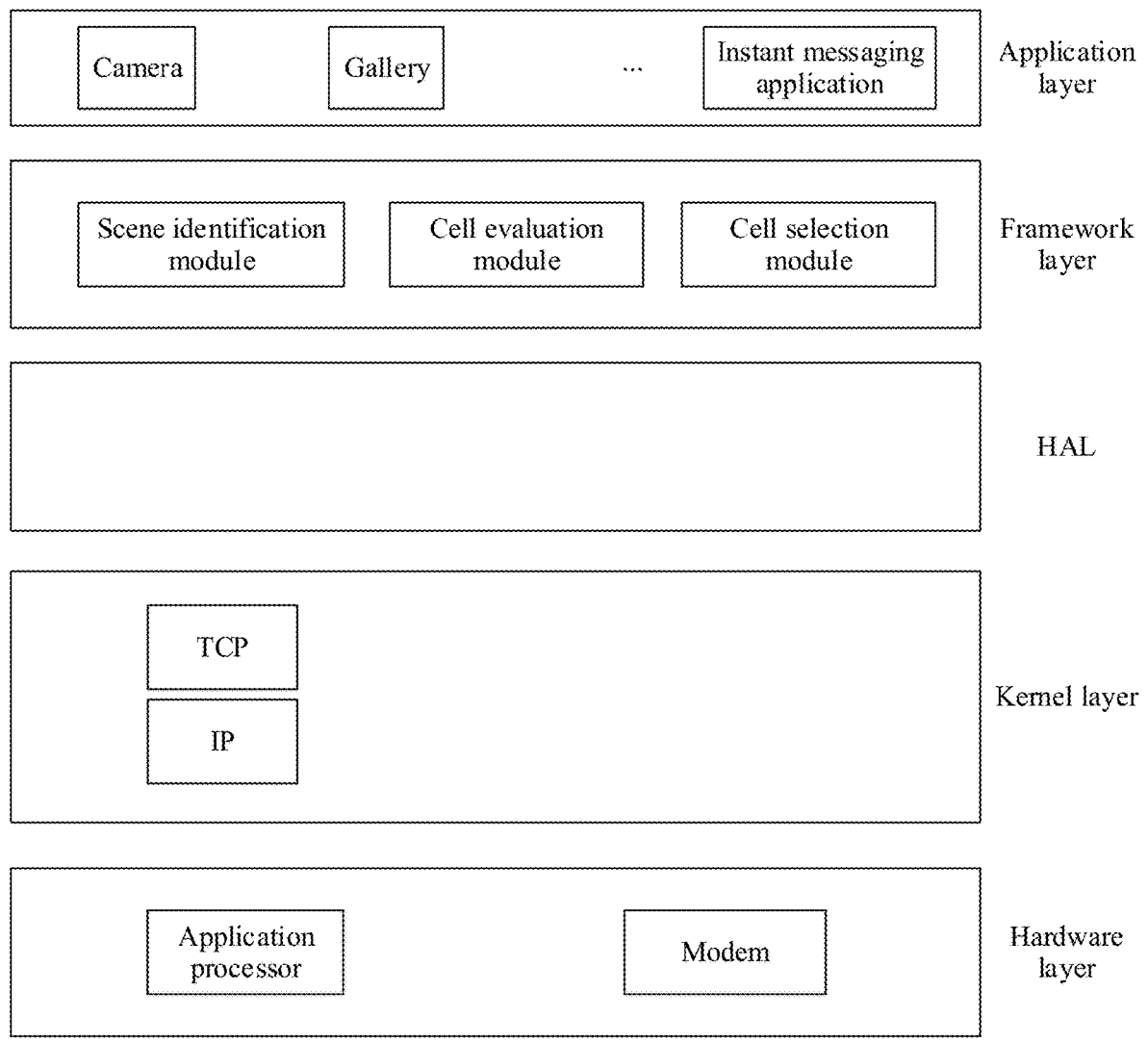
FIG. 9 is a schematic diagram of a layered architecture of a terminal device according to an embodiment of this application.

FIG. 9 is a block diagram of a layered structure of an electronic device according to an embodiment of this application. As shown in FIG. 9, the structure of the electronic device may be a layered architecture, for example, may be divided into several layers, and each layer has a clear role and task. The layers communicate with each other through a software interface. In some embodiments, a system is divided into five layers: an application program layer (application layer for short), an application framework layer (FWK), a hardware abstraction layer (HAL), a kernel layer, and a hardware layer from top to bottom.

The application layer may include a series of application packages. FIG. 9 shows only examples of Camera, Gallery, an instant messaging application, and the like. Actually, more applications may be further included. For example, Settings, a skin module, a user interface (UI), Calendar, Phone, Maps, Navigation, WLAN, Bluetooth, Music, and Videos may be further included. The instant messaging application may include, for example, applications such as MeeTime and a terminal SMS message application.

The application framework layer provides an application programming interface (API) and a programming framework for an application at the application layer. The application framework layer may include some predefined functions.

As shown in FIG. 9, the framework layer includes modules such as a scene identification module, a cell evaluation module, and a cell selection module. For a function of the scene identification module, refer to the procedures of the scene identification module in embodiments shown in FIG. 4A to FIG. 4C and FIG. 5A and FIG. 5B. For a function of the cell evaluation module, refer to the procedures of the cell evaluation module in embodiments shown in FIG. 4A to FIG. 6B. For a function of the cell selection module, refer to the procedure of the cell selection module in the embodiment shown in FIG. 4A to FIG. 4C.

It should be understood that the framework layer may further include other modules, such as a window manager service (WMS), a content provider, a view system, a phone manager, a resource manager, and a notification manager. The WMS is configured to manage a window, and includes window establishment, position or size adjustment, window closing, and the like. The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history and bookmarks, a phone book, and the like. The view system includes visual controls, such as a control for displaying a text and a control for displaying an image. The view system may be configured to construct an application. A display interface may include one or more views. For example, a display interface including an SMS notification icon may include a text display view and an image display view. The phone manager is configured to provide a communication function of the electronic device, for example, management of a call status (including answering, declining, or the like). The resource manager provides, for an application, various resources such as a localized character string, an icon, an image, a layout file, and a video file. The notification manager enables an application to display notification information in the status bar, and may be configured to convey a notification message. The notification manager may automatically disappear after a short pause without requiring a user interaction. For example, the notification manager is configured to notify download completion, give a message notification, and the like. The notification manager may be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is produced, the electronic device vibrates, or the indicator light blinks.

The kernel layer is a layer between hardware and software. As shown in FIG. 9, the kernel layer includes protocol layers such as a TCP layer and an IP layer. For a function of the TCP layer, refer to the procedures of the TCP layer in embodiments shown in FIG. 6A and FIG. 6B and FIG. 7A and FIG. 7B. Certainly, the kernel layer may further include an input device driver, a display driver, a camera driver, an audio driver, a sensor driver, and the like.

The hardware layer includes an application processor (AP) and a modem.

The application processor is configured to execute a related procedure for determining historical QoE of a cell. For example, the application processor is configured to obtain historical QoE of a cell. For example, a scene identification module and a cell evaluation module may be integrated into the application processor. For functions, refer to the foregoing descriptions.

The modem is configured to perform cell measurement, suppress or enhance a cell measurement result, select a cell, and the like. For example, a cell selection module may be integrated into the modem. For a function, refer to the foregoing description.

For example, the application processor sends the historical QoE of the cell to the modem, and the modem selects the cell based on the historical QoE of the cell. The cell selection process of the modem includes Case 1 and Case 2 in Embodiment 2. Details are not described herein again.

It may be understood that the software structure shown in FIG. 9 does not constitute a limitation on the software structure of the electronic device. For example, the electronic device may include more or fewer layers than those in FIG. 3. This is not limited in an embodiment of the application.

Reference to "an embodiment", "some embodiments", or the like described in this specification indicates that one or more embodiments of this application include a feature, structure, or characteristic described with reference to embodiments. Therefore, in this specification, statements such as "in an embodiment", "in some embodiments", "in some other embodiments", and "in other embodiments", that appear at different places do not necessarily mean referring to a same embodiment, instead, the statements mean referring to "one or more but not all of embodiments", unless otherwise emphasized in other ways. Terms "include", "contain", "have", and variants of the terms all mean "include but are not limited to", unless otherwise emphasized in other ways.

In addition, according to the context, the term "when" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if determining" or "in response to determining" or "when (a stated condition or event) is detected" or "in response to detecting (a stated condition or event)". In addition, in the foregoing embodiments, relationship terms such as first and second are used to distinguish one entity from another entity, but do not limit any actual relationship and sequence between these entities.

In embodiments provided in this application, the methods provided in embodiments of this application are described from the perspective in which the terminal device (for example, the mobile phone) is used as an execution body. To implement functions in the foregoing methods provided in embodiments of this application, the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like. In a case in which no conflict occurs, the solutions in the foregoing embodiments may be combined for use.

It should be noted that a part of this patent application document includes content protected by copyright laws. The copyright owner reserves the copyright except for making a copy of patent documents of the Patent Office or content of recorded patent documents.

What is claimed is:

1. A cell selection method, comprising:
   detecting, by a terminal device, a plurality of cells;
   obtaining, by the terminal device, historical quality of experience (QoE) of each of N cells which are all or some of the plurality of cells, wherein N is a positive integer, and wherein the historical QoE is used to represent historical network use experience of the terminal device in each cell;
   selecting, by the terminal device, a first cell from the plurality of cells based on the historical QoE; and
   camping, by the terminal device, on the first cell.

2. The method according to claim 1, further comprising:
   when the N cells are all of the plurality of cells, obtaining, by the terminal device, a first measurement result of each of the N cells, wherein the first measurement result comprises reference signal receiving power (RSRP) and/or reference signal receiving quality (RSRQ); and
   suppressing or enhancing, by the terminal device, the first measurement result of each cell based on the historical QoE of each of the N cells, to obtain a second measurement result, wherein the first cell is a cell, in the N cells, whose second measurement result is the highest or whose second measurement result is greater than a threshold.

3. The method according to claim 1, further comprising:
   when the N cells are some of the plurality of cells, obtaining, by the terminal device, a first measurement result of each of the plurality of cells, wherein the first measurement result comprises RSRP and/or RSRQ; and
   suppressing or enhancing, by the terminal device, the first measurement result of each cell based on the historical QoE of each of the N cells, to obtain a second measurement result, wherein the first cell is a cell whose measurement result is the highest or whose measurement result is greater than a threshold in second measurement results of the N cells and first measurement results of remaining cells, and wherein the remaining cells are other than the N cells in the plurality of cells.

4. The method according to claim 3, wherein the suppressing or enhancing the first measurement result of each cell based on the historical QoE of each of the N cells, to obtain the second measurement result comprises:
   determining an evaluation result of the historical QoE of each of the N cells, wherein the evaluation result represents historical evaluation of network performance of a cell based on network use experience of the cell when the terminal device is connected to each of the N cells; and suppressing or enhancing the first measurement result of each cell based on the evaluation result, to obtain the second measurement result.

5. The method according to claim 4, wherein the suppressing or enhancing the first measurement result of each cell based on the evaluation result, to obtain the second measurement result comprises:
determining suppression strength or enhancement strength corresponding to the evaluation result; and
suppressing or enhancing the first measurement result of each cell based on the suppression strength or the enhancement strength.

6. The method according to claim 3, further comprising:
determining, by the terminal device, whether there is an evaluation result of the historical QoE of the first cell, and if there is no evaluation result of the historical QoE of the first cell, evaluating network performance of the first cell to obtain an evaluation result, wherein if the evaluation result meets a condition, continuing camping, by the terminal device, on the first cell; or
if the evaluation result does not meet a condition, canceling suppression on first measurement results of the N cells; and
selecting a second cell based on the first measurement results of the N cells and third measurement results of the remaining cells, wherein a serving cell of the terminal device changes from the first cell to the second cell.

7. The method according to claim 6, wherein that the evaluation result meets a condition comprises at least one of:
the evaluation result indicating that the network performance of the first cell is smooth;
the evaluation result indicating that a quantity of times that the network performance of the first cell is smooth within preset duration is greater than a preset quantity of times;
the evaluation result indicating that duration in which the network performance of the first cell is smooth is greater than preset duration;
the evaluation result indicating that the network performance of the first cell is higher than network performance of a plurality of neighboring cells; or
the evaluation result indicating that the network performance of the first cell is higher than a threshold.

8. The method according to claim 4, wherein a higher evaluation result of historical QoE indicates lower suppression strength on a cell or higher enhancement strength on a cell.

9. The method according to claim 1, wherein the obtaining the historical QoE of each of N cells comprises:
obtaining, by an application processor in the terminal device, the historical QoE of each of the N cells, wherein
the historical QoE of each cell is historical evaluation of network performance of the cell based on network use experience of the cell after the terminal device is connected to each cell.

10. The method according to claim 9, wherein the selecting the first cell from the plurality of cells based on the historical QoE comprises:
sending, by the application processor, the historical QoE of each of the N cells to a modem in the terminal device, so that the modem selects the first cell from the plurality of cells based on the historical QoE.

11. The method according to claim 10, wherein when the N cells are all of the plurality of cells, the modem is further configured to:
obtain a first measurement result of each of the N cells, wherein the first measurement result comprises RSRP and/or RSRQ; and
suppress or enhance the first measurement result of each cell based on the historical QoE of each of the N cells, to obtain a second measurement result; and
that the modem selects the first cell from the plurality of cells based on the historical QoE comprises:
determining, in the N cells, that the cell whose second measurement result is the highest or the cell whose second measurement result is greater than a threshold is the first cell.

12. The method according to claim 10, wherein when the N cells are some of the plurality of cells, the modem is further configured to:
obtain a first measurement result of each of the plurality of cells, wherein the first measurement result comprises RSRP and/or RSRQ; and
suppress or enhance the first measurement result of each cell based on the historical QoE of each of the N cells, to obtain a second measurement result; and
that the modem selects the first cell from the plurality of cells based on the historical QoE comprises:
determining, as the first cell, the cell whose measurement result is the highest or whose measurement result is greater than a threshold in second measurement results of the N cells and first measurement results of remaining cells, wherein the remaining cells are other than the N cells in the plurality of cells.

13. The method according to claim 1, wherein
the first cell is with a best historical QoE in the N cells;
the first cell is with a best historical QoE in the N cells in a first time period comprising a current time point of the terminal device; or
the first cell is with a best historical QoE in the N cells in a second time period after a current time point of the terminal device, and a time difference between start time of the second time period and the current time point is less than a threshold.

14. The method according to claim 13, wherein the historical QoE comprises a historical smoothness rate and/or a historical stalling rate, wherein the cell with the best historical QoE is a cell with a highest historical smoothness rate and/or a lowest historical stalling rate, wherein the historical smoothness rate is a historical probability that network smoothness occurs when the terminal device is connected to a cell, and wherein the historical stalling rate is a historical probability that network stalling occurs when the terminal device is connected to a cell; or
the historical QoE comprises a historical QoE evaluation result, wherein the cell with the best historical QoE is a cell whose historical QoE evaluation result is the highest or whose historical QoE evaluation result is greater than a threshold, and wherein the historical QoE evaluation result is historical evaluation of network performance of a cell based on network use experience of the cell after the terminal device is connected to the cell.

15. The method according to claim 1, wherein the terminal device detects that locations of the plurality of cells are a first location; and wherein
after the selecting the first cell from the plurality of cells based on the historical QoE, the method further comprises:

controlling the terminal device to switch to a default mode, wherein in the default mode, the terminal device selects a target cell based on a first measurement result of a cell, and wherein the first measurement result comprises RSRQ and/or RSRP; and selecting, by the terminal device, a third cell in the default mode when the terminal device arrives at the first location again, wherein the third cell is different from the first cell.

16. The method according to claim 15, wherein that the third cell is different from the first cell comprises:

RSRQ and/or RSRP of the first cell are/is lower than those/that of the third cell, and QoE of the first cell is higher than that of the third cell.

17. The method according to claim 1, wherein before obtaining the historical QoE of N cells in the plurality of cells, the method further comprises:

determining that signal strength of a serving cell is less than a threshold;

detecting that a location changes and/or a displacement change amount is greater than a preset value;

detecting that a preset scene is entered, wherein the plurality of cells are cells corresponding to the preset scene; or determining that current time reaches specific time.

18. The method according to claim 1, wherein the terminal device stores a correspondence among a scene, a time period, a cell, and historical QoE of the cell, and the N cells are cells that match a current time period and a current scene according to the correspondence; and wherein before the selecting the first cell from the plurality of cells based on the historical QoE, the method further comprises:

determining that a quantity of historical QoE statistics collection times of the N cells is greater than a preset quantity of times; or determining that a quantity of cumulative days of historical QoE statistics collection of the N cells is greater than a preset quantity of days.

19. The method according to claim 4, wherein the evaluation result of the historical QoE meets:

$$\sum_{i}^{N} Xi * Yi,$$

wherein i is an $i^{th}$ performance label of a cell, N is a total quantity of performance labels, Xi is an occurrence probability of the $i^{th}$ performance label, Yi is a weight corresponding to the $i^{th}$ performance label, a sum of weights corresponding to all performance labels is 1, and the performance label is a level classified by the terminal device for network performance of the cell.

20. The method according to claim 1, wherein the first cell is different from a fourth cell with strongest RSRP and/or strongest RSRQ in a plurality of neighboring cells of a fifth cell which is a serving cell before the terminal device connected to the first cell.

* * * * *